US010747422B2

(12) United States Patent
Witkowski et al.

(10) Patent No.: US 10,747,422 B2
(45) Date of Patent: Aug. 18, 2020

(54) CLIENT TERMINAL USER INTERFACE FOR INTERACTING WITH CONTACTS

(71) Applicant: Drupe Mobile Ltd., Kfar-Saba (IL)

(72) Inventors: Barak Witkowski, Kfar-Saba (IL); Assaf Ziv, Herzlia (IL)

(73) Assignee: Drupe Mobile Ltd., Kfar-Saba (IL)

( * ) Notice: Subject to any disclaimer, the term of this patent is extended or adjusted under 35 U.S.C. 154(b) by 264 days.

(21) Appl. No.: 15/509,218

(22) PCT Filed: Sep. 16, 2015

(86) PCT No.: PCT/IL2015/050937
§ 371 (c)(1),
(2) Date: Mar. 7, 2017

(87) PCT Pub. No.: WO2016/042553
PCT Pub. Date: Mar. 24, 2016

(65) Prior Publication Data
US 2017/0277424 A1    Sep. 28, 2017

Related U.S. Application Data

(60) Provisional application No. 62/051,974, filed on Sep. 18, 2014.

(51) Int. Cl.
*G06F 3/0482* (2013.01)
*G06F 3/0488* (2013.01)
(Continued)

(52) U.S. Cl.
CPC .......... *G06F 3/04883* (2013.01); *A63F 13/87* (2014.09); *G06F 3/0482* (2013.01);
(Continued)

(58) Field of Classification Search
CPC .... G06F 3/041; G06F 3/04883; G06F 3/0482; A63F 13/87; H04M 1/27455; H04M 1/274583; H04M 1/72583; H04M 2250/22
See application file for complete search history.

(56) References Cited

U.S. PATENT DOCUMENTS 9,225,537 B1 * 12/2015 Hendricks ........... H04L 12/1813
2009/0276701 A1 * 11/2009 Nurmi .................... G06F 3/0238
715/702
(Continued)

FOREIGN PATENT DOCUMENTS

CN    102111503    6/2011
CN    102549574    7/2012
(Continued)

OTHER PUBLICATIONS

International Preliminary Report on Patentability dated Mar. 30, 2017 From the International Bureau of WIPO Re. Application No. PCT/IL2015/050937. (7 Pages).
(Continued)

Primary Examiner — Rinna Yi

(57) ABSTRACT

There is provided a computerized method for establishing a communication session with at least one contact based on a cross display gesture, comprising: displaying an array of contacts at a first location on a display of an interactive user interface on a screen of a client terminal; displaying an array of applications at a second location on the display of the interactive user interface, the first and second locations being located on opposite sides of the screen separated by an interactive region of the interactive user interface; identifying a cross display gesture manually performed by the user, the cross display gesture connecting a certain contact of the array of contacts with a certain application of the array of applications while crossing some of the interactive region;
(Continued)

and establishing a communication session between the user and the certain contact activated by the certain application.

13 Claims, 12 Drawing Sheets

(51) Int. Cl.
 *G06Q 30/02*  (2012.01)
 *G06Q 10/10*  (2012.01)
 *G06Q 50/00*  (2012.01)
 *H04M 1/2746*  (2020.01)
 *H04M 1/27475*  (2020.01)
 *A63F 13/87*  (2014.01)
 *H04M 1/725*  (2006.01)

(52) U.S. Cl.
 CPC ......... *G06F 3/0488* (2013.01); *G06Q 10/107* (2013.01); *G06Q 30/0251* (2013.01); *G06Q 50/01* (2013.01); *H04M 1/2746* (2020.01); *H04M 1/27475* (2020.01); *H04M 1/72583* (2013.01); *H04M 2250/22* (2013.01)

(56) References Cited

U.S. PATENT DOCUMENTS

| | | | |
|---|---|---|---|
| 2011/0083111 A1 | 4/2011 | Forutanpour et al. | |
| 2011/0231407 A1 | 9/2011 | Gupta et al. | |
| 2013/0024815 A1 | 1/2013 | O | |
| 2013/0102290 A1 | 4/2013 | Akhtar et al. | |
| 2014/0096083 A1* | 4/2014 | Kim | G06F 3/04842 715/835 |
| 2014/0245224 A1* | 8/2014 | Roh | G06F 9/44505 715/808 |
| 2016/0055342 A1* | 2/2016 | Bivona | G06F 21/62 726/26 |

FOREIGN PATENT DOCUMENTS

| | | |
|---|---|---|
| CN | 103164107 | 6/2013 |
| CN | 103164146 | 6/2013 |
| GB | 2486707 | 6/2012 |
| WO | WO 2009/156009 | 3/2009 |
| WO | WO 2016/042553 | 3/2016 |

OTHER PUBLICATIONS

International Search Report and the Written Opinion dated Jan. 7, 2016 From the International Searching Authority Re. Application No. PCT/IL2015/050937.
Mendjisky "Startup Accelerator Fourth Cycle of Microsoft Comes to End With the Recruitments of $ 8 Million", Start-Ups, pp. 1-9, Jun. 12, 2014. With English Machine Translation.
Notification of Office Action and Search Report dated Oct. 9, 2019 From the State Intellectual Property Office of the People's Republic of China Re. Application No. 201580062547.7. (16 Pages).

\* cited by examiner

CLIENT TERMINAL USER INTERFACE FOR INTERACTING WITH CONTACTS

RELATED APPLICATIONS

This application is a National Phase of PCT Patent Application No. PCT/IL2015/050937 having International filing date of Sep. 16, 2015, which claims the benefit of priority under 35 USC § 119(e) of U.S. Provisional Patent Application No. 62/051,974 filed on Sep. 18, 2014. The contents of the above applications are all incorporated by reference as if fully set forth herein in their entirety.

BACKGROUND

The present invention, in some embodiments thereof, relates to a user interface and, more specifically, but not exclusively, to a user interface for client terminals for interacting with contacts.

Contacts of a user of a client terminal are stored in a special application designed to store contact information, for example, a phone directory application, or an address application. Some communication applications contain their own contact directory based on the communication medium supported by the communication application, for example, some email clients contain a directory of email addresses of contacts.

To communicate with a certain contact, a user opens up the directory application, looks up the contact based on his/her name, identifies the contact information (e.g., phone number or email), and then contacts the person using a different application (e.g., a voice dialer application or an email client).

Another way of communicating with the contact is to first open up a communication application based on a certain communication medium, for example, an email client. The internal directory of the communication application may be accessed to retrieve the email of the person. The contact may then be communicated with from the communication application using the communication medium details retrieved from the external or internal directory (e.g., phone number, or email).

SUMMARY

According to an aspect of some embodiments of the present invention there is provided a computerized method for establishing a communication session with at least one contact based on a cross display gesture, comprising: displaying an array of contacts at a first location on a display of an interactive user interface on a screen of a client terminal; displaying an array of applications at a second location on the display of the interactive user interface, the first and second locations being located on opposite sides of the screen separated by an interactive region of the interactive user interface; identifying a cross display gesture manually performed by the user, the cross display gesture connecting a certain contact of the array of contacts with a certain application of the array of applications while crossing some of the interactive region; and establishing a communication session between the user and the certain contact activated by the certain application.

Optionally, the cross display gesture is a substantially linear line with slight deviations based on user hand tremor.

Optionally, the cross display gesture is applied in a single un-interrupted continuous manner between the certain contact and the certain application.

Optionally, the first location is in proximity to an edge of the screen, and the second location is in proximity to an opposite edge of the screen.

Optionally, the interactive region is selected from the group consisting of: a home screen, a lock screen, and a screen of an application executed in the background.

Optionally, establishing the communication session comprises transmission of content currently displayed in the interactive region. Optionally, the user interface is launched while an application having the content currently displayed is running.

Optionally, the method further comprises dynamically adapting the contacts according to behavioral patterns of the user of the client terminal, based on likelihood of the user contacting the contacts from at least one of: a certain location and at a certain time of the day.

Optionally, the method further comprises dynamically adapting the contacts according to contacts using a certain application hosted on the respective client terminal of the contact.

Optionally, the method further comprises dynamically adapting the applications according to an analysis indicative of certain applications the user is likely to use for establishing the communication session. Optionally, the analysis is indicative of certain applications the user is likely to use for establishing the communication session with the certain contact. Optionally, the dynamically adapting is performed while the user is still performing the cross display gesture.

Optionally, the method further comprises dynamically changing the applications during the single gestures based on the certain contact, wherein dynamically changing includes at least one member selected from the group consisting of: re-ordering the applications, visually changing the applications, marking the applications, deleting at least one application, and adding at least one new application. Optionally, the dynamically changing is based on at least one member selected from the group consisting of: history of applications used by the user to communicate with the certain contact, history of applications used by the certain contact to communicate with the user and/or other contacts of the certain contacts, history of applications used by the user to communicate with contacts other than the certain contact, applications supported by the certain contact, time, geographical location, the dynamic presence state of the certain contact, and information provided by the application running in the background. Alternatively or additionally, the method further comprises receiving from the certain contact a manual definition for performing the dynamically changing, and dynamically changing the applications based on the manual definition. Alternatively or additionally, the method further comprises displaying at least one corporate contact within the array of contacts, and dynamically changing the applications based on definitions obtained from the corporate contact for establishing communication sessions with the corporate contact.

Optionally, the operation of the certain application for establishing the communication session is triggered by a background executed application within the interactive region.

Optionally, the method further comprises gathering contact details and contact activity information of a plurality of contacts from a plurality of communication applications installed on the client terminal; analyzing the contact details and contact activity information for each contact of the plurality of contacts of the plurality of communication applications, to prioritize the contacts based on likelihood of a user of the client terminal contacting each respective contact; and generating a prioritized contact list based on the prioritized contacts, the prioritized contact list being a selected sub-set of the gathered contacts based on the highest likelihood of being contacted by the user;

wherein the array of contacts is obtained from the prioritized contact list.

Optionally, the cross display gesture comprises dragging and dropping the certain contact on the certain application.

Optionally, the method further comprises generating a presence state for the contacts of the user based on multiple parameters obtained from multiple different applications, the presence state representing the ability to interact with the respective contact, and performing at least one of the following based on the presence state for each respective contact: generating the array of contacts, reordering the array of contacts, and selecting the array of application. Optionally, the presence state is calculated based on one or more parameters selected from the group consisting of: time of day, day of the week, hour of the day, geographical location, calendar events, current call status, when the client terminal was last touched, driving state, the applications installed on the client terminal, applications currently being executed on the client terminal, network connectivity state, wireless connectivity state, battery state, relative frequency of application used by the certain contact, and manual configuration settings.

Optionally the plurality of applications includes a navigation application, and establishing the communication session includes activating the navigation application to provide travel directions to an address of the certain contact obtained from an address book application or to a current geographical location of the certain contact obtained from a mobile device of the certain contact.

Optionally, the certain contact represents a group of different contacts, and establishing the communication session includes establishing a multi-party communication session based on the certain application including members of the certain contact in a manner similar to establishing the communication session with a single contact. Optionally, establishing the multi-party communication session is selected from the group consisting of: a conference call, different IM applications, email, navigation to a group location, and a calendar event.

Optionally, certain contacts of the array of contacts are selected based on at least one member of a group comprising of: history of interactions between the user and each respective contact, number of interactions between the user and each respective contact, and known social circles of the contact.

Optionally, the array of contacts includes a picture and a name automatically extracted from one or more of communications applications installed on the client terminal.

Optionally, the number of members of the array of contacts is selected to fit within the screen space of the client terminal such that all selected members are simultaneously visible on the client terminal screen without scrolling.

Optionally, the method further comprises searching for a certain contact through a plurality of different applications installed on the client terminal, based on interaction information for each of the plurality of different applications.

Optionally, the method further comprises gathering recent contact activity information for single contacts and group contacts based on a plurality of communication applications installed on the client terminal; and presenting a united recent label including, for each respective contact of the displayed array of contacts having recent communication sessions, a list of recent communication activity and the respective communication application.

Optionally, the method further comprises gathering a plurality of contact details for a plurality of contacts based on a time sensitive relationship of each of the plurality of contacts obtained from a plurality of applications installed on the client terminal; presenting a temporary contact group including respective contacts of the displayed array of contacts having the respective time sensitive relationship; and selecting the certain application for establishing the communication session with the certain contact selected from the temporary contact group.

Optionally, the method further comprises intercepting, at the client terminal, a plurality of incoming transmissions of communication notifications based on different communication media; identifying the sending contact; organizing, for each sending contact, the intercepted communication notifications; and presenting, for each sending contact, the intercepted communication notifications for each respective type of communication media; wherein the intercepted communication notification are grouped per sending contact.

Optionally, the method further comprises displaying on the screen independently of activation of the user interface, an icon representing the sending contact having at least one unread and/or missed communication notification, and at least one icon representing the respective application used to transmit the communication notification.

Optionally, the user interface including the array of contacts and the plurality of applications is presented when the client terminal is in a screen lock mode, wherein performing the gesture unlocks the screen lock mode, and wherein completion of the established communication session re-locks the screen lock mode.

Optionally, the method further comprises activating a driving mode, wherein the number of displayed contacts and displayed applications are reduced during the driving mode for easier selection and activation during driving.

Optionally, the plurality of applications represents different communication sessions for establishing with the same contact based on the same application.

Optionally, each displayed application represents a type of communication session, each respective type of communication session associated with a plurality of un-displayed applications for establishing the communication session with the contact, and further comprising automatically selecting a certain un-displayed application when the user selects a certain type of communication session. Optionally, automatically selecting the certain un-displayed application is based on at least one of: application usage by the selected contact, history of previous communication sessions with the selected contact, presence state of the selected contact, and preferences of the selected contact.

Optionally, the method further comprises obtaining data regarding certain applications that a client terminal of the certain contact has installed thereon and/or recently installed applications, and displaying on the client terminal of the user a message recommending at least one application not installed on the client terminal of the user which has been installed on the client terminal of the certain contact. Optionally, the message recommending includes at least one member selected from the group consisting of: an indication that a certain application of the displayed array of applications is not installed on the client terminal of the user, and a certain icon displayed with the array of applications that when selected displays recently installed applications of the selected contact.

According to an aspect of some embodiments of the present invention there is provided a system for establishing a communication session with at least one contact based on a cross display gesture, comprising: a client terminal comprising: a screen; a hardware processor; and a memory having stored thereon instructions for execution by the processor, comprising: a user interface module configured to detect a cross display gesture connecting a certain contact at a first location on the display with a certain application located at a second location of the display opposite the first location, the cross display gesture crossing some of an interactive region separating the first and second locations, and establishing a communication session between a user and the certain contact activated by the certain application.

Optionally, the certain contact is selected from an array of contact icons arranged in proximity to a first edge of the screen, and the certain application is selected from an array of application icons arranged in proximity to a second edge of the screen opposite the first edge.

Optionally, the system further comprises a central server comprising: a client terminal interface configured to communicate with the client terminal, to receive gathered contact details and contact activity information of a plurality of contacts from a plurality of communication applications installed on the client terminal; an analysis module configured to analyze the contact details and contact activity information for each peer contact of the plurality of contacts of the plurality of communication applications, to prioritize the contacts based on likelihood of a user of the client terminal contacting each respective peer contact; and a priority list module configured to generate at least one prioritized contact list based on the prioritized contacts, the at least one prioritized contact list being a selected sub-set of the gathered contacts based on the likelihood of being contacted by the user; wherein the at least one generated prioritized contact list is provided to the client terminal interface for transmission to the client terminal as a plurality of contact icons for display.

Optionally, the system further comprises a gathering module configured for installation on the client terminal and to gather contact details and contact activity information of a plurality of contacts from a plurality of communication applications installed on the client terminal.

Optionally, the user interface is configured to detect a drag of an icon of the certain contact across the interactive region and a drop of the certain contact icon on an icon of the certain application.

Optionally, the system further comprises a context module configured for installation on the client terminal or a central server in communication with the client terminal, and to: receive context and/or content of a certain application actively running on the client terminal having a screen displayed within the interactive region; and trigger dynamic re-selection or re-ordering of an array of contact based on the received context and/or content.

According to an aspect of some embodiments of the present invention there is provided a computerized method for sharing content with a contact, comprising: detecting a selection of a certain contact from an array of contacts at a first location on a display of an interactive user interface on a screen of a client terminal; identifying a cross display gesture manually performed by the user, the cross display gesture being initiated from the certain contact and crossing through some of an interactive region that displays content of a screen of an application executed in the background; and establishing a communication session between the user and the certain content, the communication session including a presentation of the content or a link to the content.

Optionally, the method further comprises dynamically selecting the array of contacts based on a match with the background executed application.

Optionally, the array of contacts is dynamically selected based on one or more members selected from the group consisting of: contacts that have the background executed application installed on their respective client terminals, contacts that are able to receive content based on a certain file format, contacts that are interested in the content.

Optionally, the method further comprises identifying the cross display gesture connecting the certain contact with a certain application of an array of applications located at a second location on the display of the interactive user interface, the first and second locations being located on opposite sides of the screen separated by the interactive region; and establishing the communication session to transmit the content or the link to the certain contact activated by the certain application. Optionally, the applications include functions for performing with the certain contact defined by the background executed application. Optionally, the functions are defined by an interface script integrated within the background executed application. Optionally, the background executed application is a game, and the functions are game based interactions performed between the user and the selected contact.

Optionally, the user interface is launched from within the background executed application.

Optionally, the method further comprises dynamically generating a recommendation for selection of the certain contact for the communication session based on the content of the background executed application.

Optionally, the method further comprises dynamically sorting or selecting the array of contacts based on the likelihood of the user communicating with each contact based on the content of the background executed application.

Optionally, the method further comprises displaying an active suggestion to share the content of the background executed application with certain contacts without displaying the complete set of the array of contacts.

Optionally, an application for execution of the communication session is automatically selected based on an analysis of the content. Optionally, the application for execution of the communication session is automatically selected based on an interface script integrated within the background executed application.

Optionally, the background executed application is a web browser browsing a certain website having certain content, and establishing the communication session comprises sharing a URL of the certain website with the certain contact.

Optionally, the background executed application is a certain game, and establishing the communication session comprises inviting the selected contact to join the game.

Optionally, the cross display gesture comprises dragging and dropping an icon representing the certain contact within the interactive region.

According to an aspect of some embodiments of the present invention there is provided a system for sharing content with a contact, comprising: a client terminal comprising: a screen; a hardware processor; and a memory storing thereon instructions for execution by the processor, comprising: a user interface module configured to activate upon detection of a trigger while a certain application is background executed on the client terminal, identify a cross display gesture manually performed by the user, the cross display gesture being initiated from a certain contact of a displayed array of contacts at a first location on the screen, the cross display gesture cross through at least some of an interactive region displaying content of the background executed application, and establishing a communication session between the user and the certain contact, the communication session including a presentation or a link to the content.

Optionally, the user interface module is further configured to detect continuation of the gesture towards a certain application of an array of applications arranged a second location opposite the first location including the interaction region between the first and second location, the user interface module further configured to activate the communication session using the certain application based on the content of the actively running application.

Optionally, the system further comprises a central server containing an interface script for download and integration within an application development configured for installation on the client terminal or for remote execution by the client terminal, the application development configured for execution as the background executed application, the interface script having program instructions to generate instructions to the user interface denoting functions for interacting with the selected contact based on content of the background executed application. Optionally, the interface script is selected from the group consisting of: software development kit (SDK) and application programming interface (API).

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
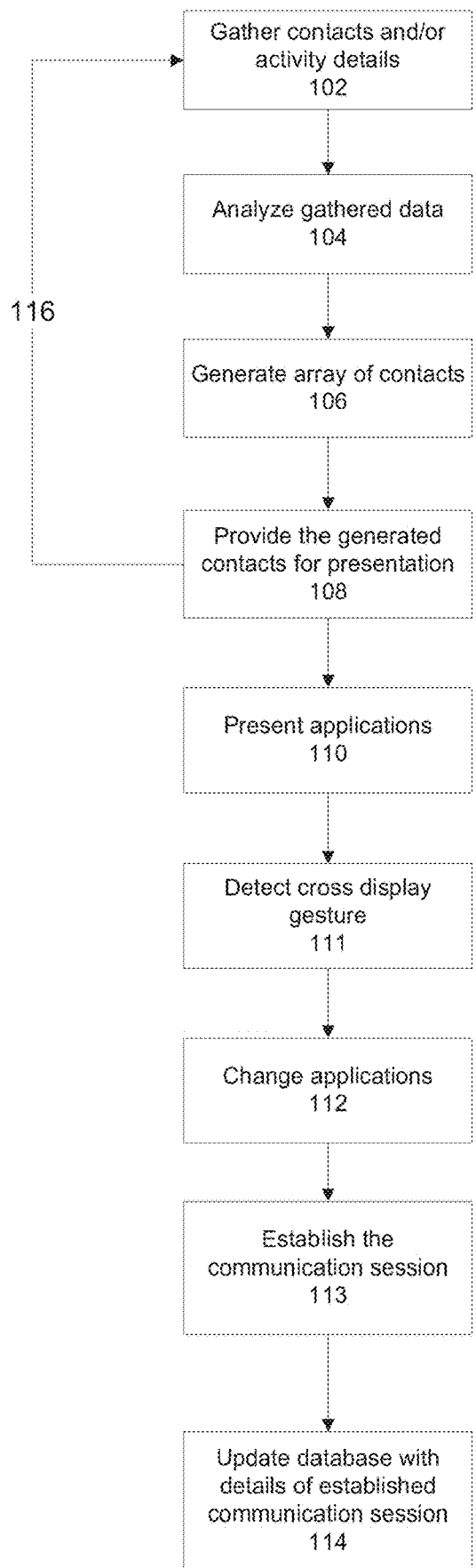
FIG. 1 is a flowchart of a method for establishing a communication session with one or more contacts, in accordance with some embodiments of the present invention.

The present invention, in some embodiments thereof, relates to a user interface and, more specifically, but not exclusively, to a user interface for client terminals for interacting with contacts.

An aspect of some embodiments of the present invention relates to systems and/or methods for establishing a communication session with one or more contacts selected from a group based on a cross display single manual, optionally linear, gesture performed by a user. The cross display gesture may be performed by creating a single line connecting two locations on opposite sides of a display of a user interface on a screen of a client terminal. The line connects a selected contact icon (on one side of the screen) and a selected application (on the opposite side of the screen) while crossing some of a home screen, a lock screen, and/or an application screen for establishing a communication session with selected contact(s). The single gesture may be performed by dragging and dropping a contact icon or a derivative thereof on one of a plurality of application icons to establish a communication session. The communication session may be a phone call with a contact represented by the contact icon, an instant messaging session with a contact represented by the contact icon, a transmission of a cellular message to the contact represented by the contact icon, and/or a transmission of content, such as an image, a webpage (e.g. link), a video, or graphics currently displayed on the crossed display to a contact represented by the contact icon.

As described herein, the term communication session may sometimes refer to a method of interaction with the select contact and/or to a function that may be performed based on the selected contact, for example, a function to recommend the user interface (as described herein) to the contact, a function to see which applications the contact recently installed, a function to play a game with the contact, a function to view a social network profile page of the contact.

Inventors realized that mobile devices are designed based on a focus on an application centric experience, which neglects the user experience for interactions, even though interactions is the main usage performed by users with the mobile device. Inventors realized that users triggering an interaction find the relevant application related to the interaction. The experience differs from one application to another, even when the logical flow is similar between the two applications. Each contact or group of contacts is defined and used within that respective application. Once the user has chosen the application, or has a contact or group within a specific application, the user cannot perform other functions towards these contacts outside the specific application.

Inventors discovered that by moving to a contact centric experience, users gain a universal and/or unified experience to trigger an interaction with any (or certain) of their contacts and/or groups. The user interface described herein provides a user experience in which all (or certain) interactions are performed exactly the same or in a similar manner, based on the single gesture described herein (e.g., swipe), independently of the current context of the client terminal (e.g., home screen, lock screen, inside an application). The interactions are performed with the contact or group the user selects for execution of the interaction. The interactions are performed within the applications and/or medium the interaction should be performed in. The contact centric experience enables presenting to the user a complex presence state of the friends of the user (as described herein, including one or more parameters, for example: location, mood, phone call state, wireless state, battery state, silent mode, and manual configuration), and adjusting the list of suggested contacts for interactions accordingly. The experience supplies a per-contact application recommendation, i.e., while starting to drag the contact, the application views are dynamically changed to indicate the preferred applications to interact with the dragged contact. The recommendations are based on multiple input variables, for example, history of interactions with that contact, how this contact runs his interactions, current presence mode of this contact (e.g., busy? with wireless network? online? battery is almost exhausted? abroad? in a meeting?), and manual configuration by the contact (e.g., how the contact prefers to receive interactions from the user right now). The user interface described herein provides the user with an on-top experience by running above executing apps. The experience differs according to the running application, for example: changing the list of contacts and/or groups displayed (e.g., those who have the same executing application, and those who might be interested in the displayed content of the executing application), changing the list of application and/or actions, and the meaning of the interaction (e.g., email a contact when inside an image gallery shares the displayed image, while email has different meaning in another application).

Optionally, the contacts and the applications are far enough from each other, so that the user spends a period of time performing the gesture while crossing over the interactive region between the contact and the application. The time period is selectively long enough to allow for dynamic changes to the displayed applications and for the user to recognize that the applications have been changed, for example, about 0.5-2 seconds, or about 1-3 seconds. That is, as the user maneuvers (e.g., a finger) between the contact towards a certain application, the displayed applications are dynamically changed, for example, re-ordered, marked with a halo, changing the size of certain icons (larger or smaller), changing the color of certain icons, making certain icons translucent, and/or re-selected as described herein. The distance between the contacts and the application is selected to be large enough so that the user takes the period of time to perform the maneuver. For example, the distance is at least about 5 cm, or about 10 cm, or about 15 cm.

Optionally, the displayed contact icons are dynamically adapted according to behavioral patterns of the user of the client terminal. The displayed contacts icons are selected to represent contacts that the user is likely to establish the communication session with, optionally from a certain location and/or at a certain time of the day. The displayed contact icons are selected based on an analysis, for example, a history of the user contacting the displayed contacts more frequently than other contacts not currently displayed, optionally in a certain day period, location, and/or after and/or when using a certain application hosted on the respective client device. The order of the displayed contact icons may be dynamically adapted to the user reflecting contacts more likely to be communicated with by the user, for example by adapting the size and/or transparency of the icons. For example, the user is estimated to establish the communication session with contacts higher up on the list than with contacts lower on the list. The displayed contacts may differ based on the application running in the background, such as when the user interface is executed as an overlay running on top of other running applications.

Alternatively or additionally, the displayed application icons are dynamically adapted to the user of the client terminal. The displayed application icons may be selected based on an analysis indicative of applications the user is likely to use for establishing the communication session. The displayed application icons may be selected in view of the displayed contact icons, denoting applications used for establishing the communication session with the displayed contacts. The displayed application icons may be dynamically re-selected and/or re-ordered after the user selected a certain contact, to reflect the applications the user is likely to select to establishing the communication session with the selected contact. Such dynamic selection and/or ordering is performed while the user still performs the single gesture.

Optionally, the contact icons are based on the contact information of the contacts, independently of an underlying application. The contacts and associated contact details for establishing the communication session may be automatically retrieved from multiple different applications installed on a client terminal of the user and/or from remote data sources such as servers (e.g., from online social network sites). In this manner, the user first selects who he/she wants to communicate with, and then establishes the communication session, instead of, for example, first selecting the application, then establishing the communication session, and then selecting the contact.

Optionally, the user selects the type of communication session independently of the application used to perform the communication. The communication session may be established in an agnostic manner. Each displayed application icon may represent a type of communication session (e.g., email, IM, phone call, event scheduling, navigation, message now, message later), instead of a specific application for establishing the communication session. Each respective type of communication session is associated with one or more un-displayed applications for establishing the communication session with the contact (e.g., to communicate by email, email client A, email client B, and email client C are available). The certain un-displayed application may be automatically selected when the user selects the type of communication session (e.g., email client B when user selected email). The certain un-displayed application may be automatically selected in a per-contact granularity. For example, the user selects to send a message without having to select which specific application to use to send the message. In another example, the user selects to make a phone call to the contact, without selecting the particular network (e.g. cellular network, or wireless data link). The actual application may be automatically selected by a suitable module, for example, based on the history of interactions with the contact, based on the presence state of the contact, based on the applications installed on the client terminal of the contact, based on preference(s) defined by the contact, and/or based on the network state of the client terminal of the contact. The application may be automatically selected on a per-contact basis, and/or on a per-communication session basis.

Effectively, the contact serves as the entry input for an application, instead of, for example, directly activating the application such as from the home screen, looking up the contact within the application, and/or intents from other applications and only then selecting a contact. The contact is an initial entry into a first application, while a second application executed in the background may trigger how to operate the first application. The first application and the second application may be the same, or different. For example, the user selects a certain contact for sharing content displayed within a web browser. The contact is the entry point into an email client (i.e., first application). The browser (i.e., second application) running in the background automatically activates the email client to send the URL of the displayed web document to the selected contact.

Multiple incoming communication messages based on different communication media, sent by different contacts may be organized based on the sending contact, instead of, for example, organized by the application and/or communication media associated with the message. In this manner, communication is organized primarily by contacts, in a cross-application manner, instead of primarily by application and/or by medium.

An aspect of some embodiments of the present invention relates to systems and/or methods for interacting with one or more contacts based on content displayed in the background of the activated user interface. The content may include and/or be based on a screen image an application executed in the background. The user interface may be activated while the active application is running, and overlaid on the screen of the actively running application. The actively running application may appear in the background, between the contacts and the applications.

Optionally, the contact for interaction is selected from a list of contacts dynamically adapted to the content of the actively running application. The list of contacts are selected based on an analysis denoting the user of the client terminal interacting with the list of contacts based on the content of the actively running application. For example, based on a history of the user previously sharing similar content with the contact.

Optionally, the user selects the content for interaction, without necessarily explicitly selecting the form of interaction. The interaction form may be automatically detected and/or selected based on the content and/or selected contact. For example, the user activates an application (e.g., web browser, game) for self-use. When the user notices content for interaction (e.g., a website, the game itself), the user may perform a gesture indicating automatic interaction with a selected contact based on the content (e.g., sharing the URL of the website with the contact, inviting the contact to play the game).

Optionally, when the user interface is activated within a running application, the displayed contact list (or certain contacts displayed in a pop-up message) is selected and/or re-sorted based on the context of the running application, to reflect contacts suitable for interaction based on the running application. The selection and/or sorting may further be based on the presence state of each contact (i.e., contacts suitable for the interaction), and/or history of interactions between the contact and the user (e.g., history of sharing similar content of the running application with the contacts). Alternatively or additionally, based on the context of the running application, members joined together as a group may be selected together for interaction, for example, based on a common type (e.g., friend, work, family).

Optionally, a script is available for integration within applications developed for execution by the client terminal to define available functions for execution between the user and the contact based on the developed application, as part of the established communication session. The script may be, for example, a software development kit (SDK), an application programming interface (API), or a set of instructions. The script may be implemented by applications locally installed on the client terminal, and/or applications remotely accessed by the client terminal, for example, websites.

The script communicates with the user interface, providing instructions for interaction with the select contact based on the content within the developed application. For example, the SDK integrated within a web browser may analyze the type of content being browsed and generate a signal of the type of content. For example, the SDK integrated within the web browser may generate a signal indicating that the URL is to be shared with the contact, for example, by email or by another message format.

Effectively, the user interface may serve as an on-top context aware application, which takes into consideration multiple input parameters, to generate new application entry points for each contact (or group of contacts) within the application, per context.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
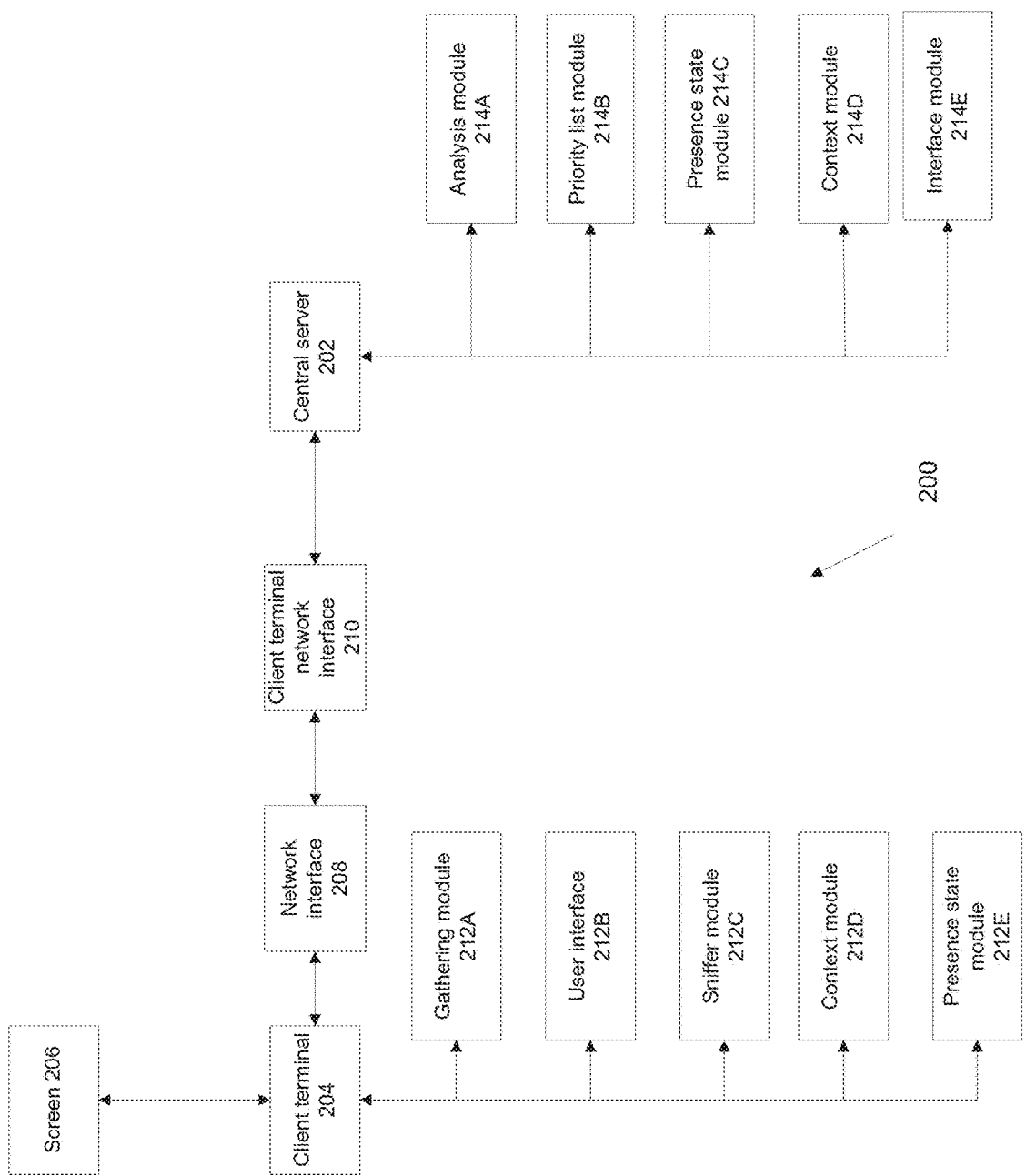
FIG. 2 is a system for establishing a communication session with one or more contacts, in accordance with some embodiments of the present invention.

Reference is now made to FIG. 1, which is a flowchart of a method for establishing a communication session with a contact based on a single cross display manual gesture, optionally a straight line, connecting between a contact representation and an application representation which are presented on top of content display presented on a touch screen of a handheld device, in accordance with some embodiments of the present invention. Reference is also made to FIG. 2, which is an exemplary system method for establishing the communication session with a contact based on the cross display gesture, in accordance with some embodiments of the present invention. The method of FIG. 1 may be executed by system 200 of FIG. 2.

The systems and/or methods described herein provide for establishing the communication session with a certain contact based on items encountered during self-use of the client terminal, for example, sharing content with the contact directly from the display of the website, and/or inviting the contact to join a game directly from a screen of the game.

The systems and/or methods described herein for establishing the communication session with selected contacts are based on a single general gesture cross display maneuver to trigger different communication session types with different contacts. Single contacts and groups of contacts may be communicated with in the same manner, such as based on the single gesture. When the communication session is established for the group, the same application may be used (e.g., a conference call, an event calendar, email, navigation to a group location) or different applications may be used (e.g., different IM applications). Groups may be automatically generated in a cross-application manner, including contact information retrieved from different applications.

The group may be communicated with in a single manner using the available applications. Temporary groups may be dynamically created, adjusted and removed, based on time sensitive factors which may be tracked, for example, as described with reference to block 308 of FIG. 3.

The user interface described herein is accessible from within other running applications, and/or the home page of the operating system of the client terminal, and/or from the lock screen mode.

System 200 includes a central server 202 in communication with multiple client terminals 204, for example, mobile devices, Smart phones, tablet computers, and desktop computers. Each client terminal 204 includes a screen 206, which may be a touch-screen configured for display and to receive user commands by contact therewith. Client terminal 204 includes a network interface 208 for communication with central server 202 over a wired and/or wireless network. Central server 202 includes a client terminal interface 210 configured for communication with the multiple client terminals 204 over the network.

At 102, contact information and/or activity information is gathered from multiple applications installed on the client terminal, optionally by a gathering module 212A installed on client terminal 204 and configured to query the installed applications to gather the data as described herein.

The queried applications include communication applications and non-communication applications. Exemplary communication applications include: voice phone call applications, short message service (SMS) applications, email clients, and instant message applications. Exemplary non-communication applications include games, digital picture albums, and web browsers.

Data may be gathered from a directory such as a phone and/or address book, for example, contact details and/or favorite contacts.

Gathered activity information may include activity logs of the respective communication applications, for example, call logs and SMS logs.

Optionally, at 104, the gathered information is analyzed. The analysis may be performed at central server 202, optionally by an analysis module 214A configured to perform the analysis as described herein. The gathered information may be transmitted from client terminal 204 to central server 202 for the analysis. Alternatively or additionally, the analysis may be performed at client terminal 204 by an analysis module installed thereon.

Optionally, the analysis includes a prioritization of the gathered contacts based on the likelihood of the user of the client terminal contacting each respective contact. The analysis may include extraction of additional contacts from the data, for example, identifying contacts that the user played a game with through data retrieved from the game application.

Data analysis at central server 202 may be conducted based on data collected from other users, to generate the prioritization and/or order of the contacts according to the data from multiple other users. The central analysis may be based on the behavior of each contact in relation to other users. For example, certain users that heavily interact with multiple other contacts may be ordered higher on the list. Alternatively, in another example, certain users that interact heavily with the certain user, but that rarely interact with other users may be ordered higher on the list.

The analysis may be based on data provided by the background executed application (as described herein), for example, obtained from the interface (e.g., SDK, API, and/or other interface script) of the background executed application. The data may be analyzed locally at the client terminal, and/or remotely at the central server. For example, a content based application running in the background (e.g., a web browser) provides data (e.g., via the SDK) related to the contact(s) that share the most content with the user and/or with other contacts. Contacts may be selected for display (as described herein) based on the data of the content based application. In another example, a game running in the background provides data of how contacts spend money in the game, such as which contacts spend the most money. The game provided data may be analyzed independently or together with other data to select the contacts for display.

The analysis may be based on a history of interactions of the user with each contact based on one or more communication media, for example, phone calls, SMS, emails, and other applications. The analysis may be based on a history of interactions of the user with contacts based on one or more non-communication applications, for example, contacts the user played a game with, or contacts the user shared pictures of a digital album with. A larger number of interactions with contacts based on a certain medium, a certain non-communication application, and/or a larger number of media used for the interactions may represent a higher priority.

The analysis may be based on data provided by the application running in the background, such as provided by an interface script, for example, SDK and/or API. Gathered contacts may be prioritized and/or ordered based on the data provided by the application running in the background. For example, when the application running in the background is a game, data regarding behavior of contacts related to the game may be provided, for example, the contacts that are more likely to spend money in the game. In another example, when the application running in the background is a news application, data regarding contacts that are more likely to re-share the page is provided.

The analysis may be based on information in the address and/or phone book. A larger number of contact details may represent a higher priority.

The analysis may be based on a time profile of the interactions. A larger number of interactions that have been recently held may represent a higher priority.

The analysis and/or prioritization may be based on the presence status of the user and/or based on the presence status of the contacts. For example, contacts having a presence status denoting that the contact is abroad, on another call, sleeping, driving, or otherwise unavailable, may be ordered lower on the list. Optionally, the prioritization is dynamic, changing at different points in time based on the current presence status.

At 106, an array of contacts (e.g., the priority contact list) is generated based on the priorities of the contacts. The priority list may be generated at central server, optionally by a priority list module 214B configured to generate the priority list as described herein. Alternatively or additionally, the analysis may be performed at client terminal 204 by a priority list module installed thereon.

Optionally, the priority list is a sub-set of contacts selected based on behavior patterns of the user, optionally based on having the highest likelihood of being contacted by the user over other contacts less likely to be contacted. Alternatively or additionally, the user of the client terminal may manually edit the list and/or select one or more contacts of the list.

Contacts may be selected for the priority list based on a known social association with other selected contacts. For example, the analysis may indicate that contact A is highly connected to contact B. Contact B may be selected for the priority list based on the selection of contact A, based on the analysis that contact B is also likely to be contacted.

Contacts may be selected for inclusion in the priority list as a group represented by a single icon. For example, when the user routinely or often contacts multiple contacts together (e.g., in a conference call or group chat session), the individual contacts may be included as a single group.

Optionally, multiple priority lists are generated. Each list may be based on a type, for example, home, friends, family, and work.

At 108, the one or more priority lists are provided for presentation on client terminal 204. The lists may be transmitted from server 202 to client terminal 204, and/or generated at client terminal 204. The lists may be presented on screen 206 by a user interface 212B stored on client terminal 204.

The list may be presented based on contact icons representing contacts of the priority list. Each icon may include a thumbnail (e.g., photo or drawing) and/or name of the represented contact. The thumbnail and name may be automatically extracted from one or more of the applications installed on client terminal 204, for example, by gathering module 212A. For example, the picture and/or name may be obtained from a contact directly, from a social network website, and/or from an instant message (IM) application. Optionally, the picture and/or name are obtained from the most recently used application for communicating with the contact. When no picture is identified, a silhouette may be displayed.

The contact icons may be arranged as a list on a certain part of the screen, for example, near the left border.

Each contact icon may represent a single contact, or a group of contacts. The name presented for the group icon may be composed from the names of the members of the group. The group icon may be marked to indicate that multiple members are represented, for example, by an indication of how many members are represented.

Optionally, the number of contact icons is selected to fit within the screen space of the client terminal so that all contact icons are simultaneously visible on the screen without the user having to scroll up or down to view remaining icons. For example, 6-9 icons, or 5-10 icons, or smaller or larger ranges are presented. The number of icons may vary depending, for example, on user selection, screen size, and screen resolution. Each contact list may be presented individually on the screen, for example, a friends list, a family list, and an office list. The user may select which list to view. Each contact may be associated with one or more lists, either automatically by priority list module 214B or manually by the user. Alternatively, the number of contacts is selected to be larger than the allowable screen space. The additional contacts may be viewed, for example, by scrolling.

The user interface including the contact icons may be launched and presented within an application that is actively running on the client terminal. The running application shown in the background may be translucent and still visible behind the user interface. When the user interface has terminated, the running application in the background is resumed. Alternatively, the user interface is launched and presented on the home screen of the client terminal.

At 110, applications for establishing the communication session are presented as part of the user interface, optionally by user interface 212B configured to establish the communication session as described herein. The applications may be presented as multiple application icons, each representing an application available for establishing the communication session with the presented contacts.

The application icons may be arranged as a list on a portion of the screen that is distinct from the location of the contact icons, for example, near the right side of the screen, and/or opposite the contact icons.

The displayed applications icons represent applications for establishing the communication session with the contacts. The communication is based on a communication medium, for example, a voice call application, an SMS application, a social network site, an internet call, an email client, an IM application, and a contact directory. The communication session may include scheduling a meeting, for example, a calendar application. The communication session may include directions to an address of the contact, for example, based on a travel direction application.

The application icons may be presented based on official representing images.

Optionally, the application icons are generalized based on one or more generic functions represented by generic icons. For example, call, message now, message later, and navigate. Each generic icon may be associated with multiple applications able to perform the function represented by the generic icon. The certain application to perform the function may be automatically selected by software and/or manually by the user. Automatic selection may be based on, for example, history of interaction with contacts using a certain application over other applications (for example, 'message now' activates IM for contact A and SMS for contact B). Manual and/or automatic selection may be configured based on a set of rules, for example, receive and/or transmit messages at night through emails, and through IM during the day. For example, make and/or receive phone calls through the cellular network when geographically located in the country, and use an internet phone application when travelling outside the country.

At 111, a cross display gesture manually performed by the user is detected, optionally by user interface 212B configured to detect and/or act upon the cross display gesture.

Figure 12:
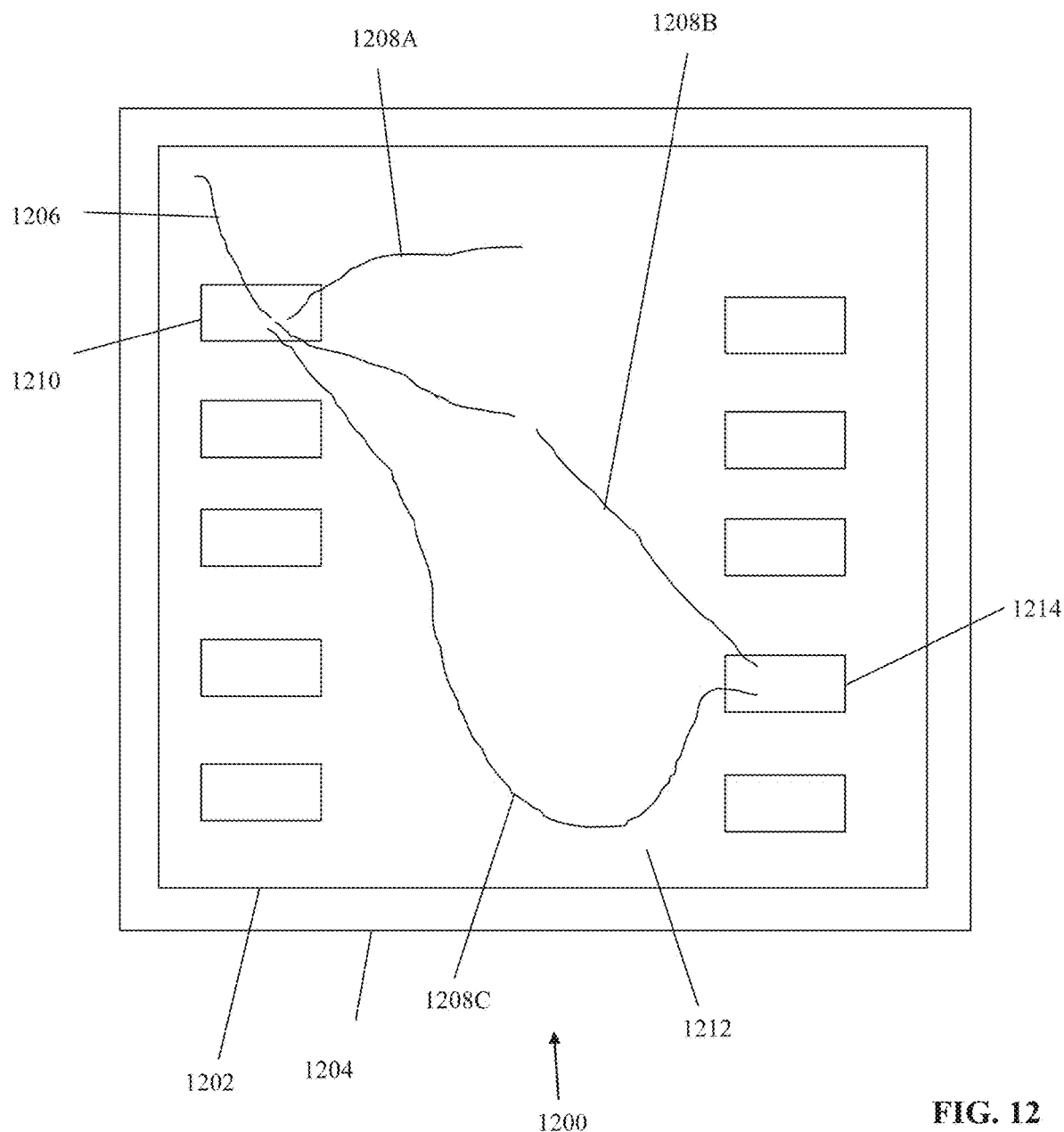
FIG. 12 is a schematic of a user interface depicting the cross display gesture, in accordance with some embodiments of the present invention.

Reference is now made to FIG. 12, which is a schematic of a user interface 1200 as described herein, to help understand the cross display gesture, in accordance with some embodiments of the present invention. Interface 1200 is displayed on a screen 1202 of a client terminal 1204, for example, a smartphone, or a tablet computer, for example, as described with reference to FIG. 2.

Optionally, an initiation gesture 1206 is detected. For example, a generally straight line starting at a corner of screen 1202 and extending outwards, for example, starting at the upper left corner and extending at an angle downwards. The detected initiation gesture triggers activation and/or display of the user interface, for example, as described with reference to block 108 of FIG. 1.

Figure 3:
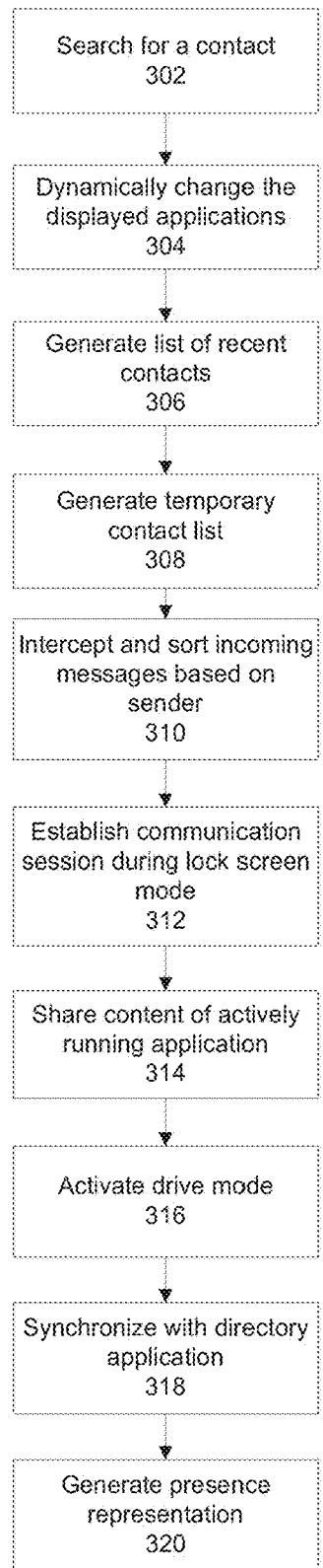
FIG. 3 is a flowchart of additional optional exemplary features based on the method of FIG. 1, in accordance with some embodiments of the present invention.

The single gesture includes selection of a certain contact icon 1210 of an array of contacts, and one or more of the following options, performed in a line connecting the contact icon with another location:

Gesture 1208A representing selection of a background executed application for sharing with the contact, based on the displayed content of the screen of the background application, for example, as described herein and/or with reference to block 314 of FIG. 3. A screen displaying content of the background executed application may be located within an interactive region 1212 located between the contact icons and the array of application icons. Optionally, the interactive region is located generally in the middle of the screen;

Gesture 1208B representing selection of an application icon 1214 for establishing the communication session with the contact, for example, as described herein and/or with reference to block 113 of FIG. 1; and Gesture 1208C representing selection of the background running application located in interactive region 1212 for sharing via a communication medium activated by application icon 1214, for example, as described herein and/or with reference to block 314 of FIG. 3. For example, sharing the background image displayed in interactive region 1212 by email or instant message represented by application icon 1214.

The cross display gesture may be performed along a straight line connecting the contact icon and/or the background and/or the application icon. The line may contain curves and/or be wavy, for example, depicting freehand motion and/or tremor of the hand of the user. The line may extend from one side of the screen (displaying the contact icons) to another side of the screen (displaying the application icons), passing through at least a portion of the interactive region displaying a screen view from the actively running application. The line may extend from opposite ends of the screen, for example, from left to right, from right to left, from top to bottom, from bottom to top, or other configurations. The line may extend from the side to an area substantially in the middle of the screen, such as away from the sides of the screen (displaying the background running application). The line may be divided into two parts, such as two separate lines. A first line extending from the side of the screen to the interactive region, and another line extending from the interactive region to another side. The two lines may be interrupted or otherwise discontinuous from each other (for example, the user removes a finger from the touch screen between the first and second lines), yet considered together as part of the same single gesture. Alternatively, the two lines are part of a single uninterrupted gestures performed in a continuous manner, for example, by the user continuously pressing the finger against the touch screen of the client terminal.

The single gesture may be performed manually by the user touching a finger (or another device) to a touch screen. The finger may be maneuvered along the screen, and/or contacting the screen at the contact icon, and/or background and/or application icon (moving in the air in between the icons and/or background). The single gesture may be performed by the user moving a cursor on the screen, for example, using a mouse, touch pad, arrow keys, voice activated cursor, or other methods. The single gesture may be based on a drag and drop method, of dragging the contact icon and dropping the contact icon on the background and/or on the application icon. The single gesture may be based on selecting the contact icon, application icon, and/or background, for example by clicking the cursor and/or hovering the cursor over the desired region.

Optionally, at 112, the displayed applications are changed, for example, by user interface 212B configured to perform the change as described herein. The changes to the application may be dynamic, as the user is performing the gesture, after having selected the contact and before reaching a certain application. The applications may be displayed based on the selected contact.

The displayed applications may be re-ordered, marked, deleted, visually changed, and/or new applications may be displayed. The displayed applications may be visually changed to represent certain applications recommended for establishing the communication session with the selected contact and/or certain application not recommended, for example, made larger (i.e., recommended), made smaller (i.e., not recommended), made brighter (i.e., recommended), and made fainter (i.e., not recommended). The visual representation may denote a recommendation ranking, for example, the largest applications are the most recommended, decreasing in size as the recommendation is reduced.

Applications placed higher up on the list and/or marked in a certain manner (e.g., highlighted) may represent recommended applications for establishing the communication session. Irrelevant applications (e.g., unsupported by the contact) may be deleted. Applications preferred by the contact, but rarely used by the user, may be added.

The changes to the applications may be made, for example, based on the history of applications used by the user to communicate with the selected contact, based on the history of applications used by the selected contact to communicate with the user and/or other contacts of the selected contacts, based on the history of applications used by the user to communicate with contacts other than the selected contact, based on applications supported by the selected contact, based on time and/or geographical location (e.g., selecting certain applications for a contact that is close to the user and a different application for the contact that is far from the user), based on the dynamic presence state of the contact (e.g., driving, sleeping, in a meeting, with low battery, without a stable wireless data connection), and based on information provided by the application running in the background.

Some examples are now described:

When the selected contact is on a phone call, the user interface may recommend to use an IM application.

When the selected contact is abroad, the user interface may recommend to use an IM application instead of the usual voice phone call the user prefers.

When the contact does not have a wireless link for data transmission, the user interface may recommend to user a voice phone call application instead of the usual voice over internet protocol (VoIP) application used for communication.

The user interface may prioritize a certain IM application over another IM application when the certain IM application is detected to be the application usually used by the contact to communicate with other contacts and/or with the user.

The user interface may prioritize an IM application when the certain contact is online. When the contact is not online, the user interface may prioritize an email client.

Optionally, the user defines (manually and/or automatically) how applications are changed when other contacts want to establish the communication session with the user. For example, the user may define a preference for being communicated with using a certain IM application. When other contacts perform the gesture for establishing the communication session with the user, the certain IM application may be prioritized and/or displayed.

Optionally, certain contacts are assigned a special status, for example, corporate contacts such as shops, restaurants, and businesses. The corporate contacts may be presented as contacts as described herein. The corporate contacts may define the way applications are changed when the corporate contact is selected and the gesture is performed. The corporate definitions are transmitted to the client terminal. For example, when the gesture is performed using a corporate contact, common applications such as SMS and phone dial may be changed to the corporate selected applications, for example, a website of the restaurant, a menu of the restaurant, a chat session with the manager of the restaurant, a coupon to the corporate contact (e.g., restaurant coupon), an application to make a reservation with the corporate contact (e.g., reserve a table at the restaurant, reserve a time and/or data for a service), and a link to an online review of the food of the restaurant.

Additional details are described with reference to block 304 of FIG. 3.

Referring back to FIG. 1, at 113, a communication session is established based on the certain contact, optionally by user interface 212B configured to perform the establishment as described herein.

The activation may be performed based on the single gesture manual command received from the user. The user may select the contact from the list of contact icons, for example, by positioning the mouse cursor over the contact icon, or pressing his/her finger on the screen location having the contact icons. The contact icon may be dragged onto the desired icon of the application, for example, by moving the finger on the screen or pressing a mouse button while moving the mouse cursor. The contact icon may be dropped onto the desired icon, for example, by removal of the finger from the screen or letting go of the mouse button. The drag and drop establishes the communication session represented by the selected application icon based on the selected contact icon.

The activation may be performed for a single contact or for a group. Exemplary communication sessions may be established as follows:

Dragging a contact icon having the name Sharon to the dialer icon to trigger a voice phone call to Sharon.

Dragging a contact icon having the name Zohar to the social network icon to trigger a social network messenger chat session with Zohar.

Dragging a contact icon representing a group to an IM application or an internet chat application triggers a group IM or internet chat session with the members of the group.

Dragging the group contact icon to a dialer icon triggers a conference call with the members of the group.

Dragging a contact icon having the name Assi to the navigation application triggers directions to Assi's address.

Dragging a contact icon having the name Assaf to the calendar icon triggers generation of a new calendar event inviting Assaf.

As described herein, when reference is made to a single contact, the reference sometimes may also refer to a group of contacts. The single contact and group of contacts represented by a single icon may sometimes be processed in a similar manner.

Certain applications may have multiple application icons representing different communication sessions with the contact, based on using the same application. For example, an IM application may have different application icons representing the communication sessions of text message chat, a video call and an audio call. The different application icons may be presented after selection of the IM application icon.

Certain contact icons may have multiple ways of triggering the same communication session when interacting with a certain application icon. For example, multiple phone numbers available for a dialer application to call, and multiple email addresses available for an email client to email. When such contact icons are dropped on the application icon, the triggered communication session may be based on a default entry. When no default entry has been set, a menu may be presented to the user allowing the user to select the trigger base. When the contact icon is hovered over the application icon without dropping (for example, above a predefined period of time), a menu may be presented to the user for selection of the trigger, and/or to allow the user to change the default entry. The default entry may be defined by the user interface module or a module on the central server, for example, the first listed contact detail, the most recently used contact detail, and/or the most common contract detail, when multiple contact details of the same type are available.

When a group icon is dragged to an application icon (e.g., voice call, video call) to initiate a communication session, a conference call may be set up. Icons (e.g., pictures and/or names) of all group members may be displayed. A first communication session (e.g., call) with the first contact (e.g., manually selected by the user from the displayed icons or automatically selected) may be initiated. The icons of the remaining group members may be displayed. The user may select from the remaining members, or the software may automatically select from the remaining members. A second communication session is initiated with the second selected contact. The first session may be placed on hold when relevant (e.g., phone call). When the second session is answered, the first and second sessions may be merged. The icons are updated to reflect the remaining members that have not yet been added to the group session.

The communication session may be based on the content of the actively running application from which the user interface has been activated, for example, as described herein and/or with reference to block 314 of FIG. 3.

Optionally, at 114, details of establishing the communication session, including the selected contact icon and/or the selected application and/or selected interaction are provided as an update, optionally of analysis module 214A. In this manner, the analysis module adapts to changes in user behavior, generating priority lists that reflect the recent user behavior. For example, when the user stops contacting a certain favorite contact, or switches the communication application used to send messages, future priority lists omit the favorite contact and contain the new communication application.

Optionally, data regarding certain applications that a client terminal of the certain contact has installed thereon and/or recently installed applications is obtained. A message recommending at least one application not installed on the client terminal of the user (but which is currently installed on the client terminal of one or more contacts) may be displayed on the client terminal of the user. The message may be an indication that a certain application of the displayed array of applications is not installed on the client terminal of the user (i.e., the displayed array of application may include one or more recommended application for installation). The message may be a certain icon displayed with the array of applications that when selected displays recently installed applications of the selected contact. For example, the certain icon contains the message "show me what this contact has recently installed". Selecting the certain icon opens a window displaying a list of icons and/or applications the friend has recently installed, which are not installed on the client terminal of the user.

Optionally, at 116, execution of blocks 102-108 is repeated, for example, based on a predefined period of time, or an event triggered by addition of additional contacts. Repeating the execution of the blocks may update the priority list to reflect recent changes, for example, new additions to the list, removal of existing list members, and/or reordering of the list to reflect changes in the presence status of the members (as described herein).

Reference is now made to FIG. 3, which is a flowchart of exemplary optional features based on the method of FIG. 1, in accordance with some embodiments of the present invention. System 200 of FIG. 2 may be configured to provide the additional features of FIG. 3.

Optionally, at 302, the user interface includes an option to perform a search for additional contacts not displayed on the priority list, optionally based on user interface module 212B configured to perform the search as described herein. The contacts are searched for in a cross-application manner, across available applications installed on client terminal 204. When the searched contact has been found, the searched contact may be used to establish the communication session as described with reference to block 113 of FIG. 1.

The search may be performed for a single contact, and/or for a defined group of contacts (e.g., defined within the different applications).

The search may be performed based on application related interaction details of the contact, for example, part of email address, IM user name, and social network nickname. The search may be performed based on generic contact details, for example, the first name and/or the last name.

When a group is matched to the search string, the group may be displayed in the search results by partial names of one or more members of the group. For example, when Barak and Assi are members of the group Soccer, a search based on the string Bar retrieves the group Soccer.

The search may proceed simultaneously as the details are entered, for example, as each letter is typed or erased. For example, when Bob is entered, the results include all matches of Bob, such as email addresses including the Bob string, social network nicknames including Bob, and phone book entries for all people having first, middle and/or last names that include Bob.

Activation of the search mode may replace the displayed priority list (e.g., of block 108 of FIG. 1) with the search results. Icons may be displayed for each search result, for example, based on the application having the match. The search result icons may be activated using the single gesture (e.g., dragged and dropped) onto the application icons to establish the communication session, as described with reference to block 113 of FIG. 1.

When the search mode has terminated (or has been closed by the user), the previously presented priority list is re-displayed on the screen.

Optionally, at 304, when the contact icon is selected during the single gestures, such as dragged (or the search icon is dragged), the displayed applications are dynamically changed based on the selected contact icon, optionally based on user interface module 212B configured to perform the change as described herein.

It is noted that block 304 may provide additional details for block 112 of FIG. 1.

Optionally, the list of the application icons is changed according to a priority of the likelihood of the user interacting with the selected contact using each respective application. The order may be selected based on one or more factors including: a manually defined user preference; a history of the interaction between the user and the dragged contact (for example, more commonly used application are ordered higher than rarely used applications); the presence state of the user (for example, applications in which the user is currently on-line are ranked higher than applications in which the user has not logged onto or where log-in is not available); according to the location of the user and/or contact; according to the status of the wireless link of the user and/or contact; and according to how the contact uses the certain applications (independently of the interaction with the user).

The applications may be sorted from most to least likely, with most likely appearing higher up on the list.

Alternatively or additionally, certain application icons are removed or dimmed. Applications that are not supported for establishing the communication session with the selected contact may be removed or dimmed. For example, SMS, email, and IM are supported for interacting with the dragged contact Hila, and appear as application icons. A certain social network may be unavailable, with the respective icon appearing dimmed.

Non-support of certain applications for establishing the communication session with certain contacts may be based on one or more factors, for example: the contact does not have the respective application installed, the contact is not registered to the service of the respective application, the user interface does not have the contact details to trigger the interaction (for example, address unavailable for navigation, and internet phone call user name unavailable), the contact has manually defined in his/her own user interface that interaction based on the respective application is unavailable, and the presence state of the contact is currently unsuitable for interaction using the respective application (for example, the user is currently on another voice call and unavailable to take a voice call from the user).

When contact information is missing for certain applications, the user interface may signal the user to enter the information.

Optionally, at 306, a recent contact list is generated based on the contacts that the user has established the communication session with recently, for example, in the last hour, last day, last week, or the top 6 (or 9 or other number) most recent contacts interacted with. The contacts are selected across multiple different applications, combining inputs from multiple communication media, for example, last call, last SMS, last email, last IM. The recent contact list unites all the latest interactions from different applications into a single log, including, for example, phone calls, instant messages, short messages, navigations, and scheduled events.

The recent contact list may be created for single contacts and/or for group contacts.

The list of recent contacts may be presented on the user interface (e.g., as described with reference to block 108 of FIG. 1), such as based on a tab or label, for example, stating Recent, or United Recent Label. Clicking on the label displays the recent contact list.

For each recent contact, details indicating the last contact may be presented. The details may represent the reason the contact was selected for the list. The details may be presented, for example, by a small icon. Exemplary details include: outgoing call, incoming call, missed call, SMS received, SMS sent, email sent, and email received. The time and/or date of the last interaction with the contact may be marked and/or presented. The preview of the last communication session (when available) may be displayed, for example, the first few words of the email, SMS, or IM message.

The contacts within the priority list may be obtained from one or more sources, such as from the main address/phone book, based on phone numbers not bound to a specific contact, and/or contacts from one or more preselected applications (e.g., an email address without a bound contact). Alternatively or additionally, the most recent interaction may be presented for each contact on the priority list displayed on the user interface (e.g., as in block 108 of FIG. 1).

The recent contact list may be generated, for example, at client terminal 204 by gathering module 212A and/or user interface 212B, and/or at server 202 by priority list module 214B or another suitable module. The contact list is presented on the screen of the client terminal by user interface 212B.

Each recent contact may be interacted with using relevant applications based on the single gesture (e.g., by drag and drop), as described with reference to blocks 111 and/or 113 of FIG. 1. For example, when the recent contact list has an icon of a certain contact having a missed call, the certain contact may be dragged to the SMS icon, IM icon or another icon to initiate a session using a different communication medium, or another interaction (e.g., directions).

The recent contact list displays a representation of the application through which the recent interaction with the contact occurred. The user may select to establish a communication session with a certain contact from the recent contact list based on the application used for the recent interaction. Alternatively, the user may select a different application for communicating with the contact.

Optionally, selecting the recent contact without performing the gesture to drag the contact to the background and/or application triggers a communication session based on the application used for the previous communication session with the same recent contact. The recent contact may be selected, for example, by clicking a cursor and/or hovering the cursor on an icon representing the recent contact.

Optionally, at 308, a temporary contact list is generated. The temporary contact list stores contacts for a temporary period of time, and is removed after the time period has elapsed. The certain contact may be selected from the temporary contact list. The displayed applications may be presented based on the temporary contact list.

Optionally, the temporary contact list is generated based on a time sensitive relationship of the contacts based on information in applications stored on the client terminal.

The time sensitive relationship may be based on an event triggered by a certain time period or time range, and having an expiration past the time period or time range, for example, based on a time or calendar event. For example, contacts having a birthday with today's date are included in the temporary list and removed after their birthday has passed. The data may be gathered, for example, from the contact phone book, from social networks, and from the generated priority list. In another example, contacts are included in the temporary list based on a calendar event in the calendar application stored on the client terminal. All participants in a certain calendar event may be included as a group icon (as described herein). The group icon allows for establishing the communication session with the entire group, for example, group communication, such as, sending emails or IM messages before the meeting. Dragging the group icon to a map and/or navigation application generates directions to the event.

The time sensitive relationship may be based on a triggering event that is expected to be temporary, for example, changes in geographical location. For example, contacts that appear within a predefined geographical location in proximity to the user are included in the temporary list and removed when the contact moves out of the geographical boundary. For example, all contacts near the user during a music concert. The data may be gathered, for example, from the mobile device of the contact when the contact is subscribed to the central server service, from social networks, or from other inputs.

An on-top notification may be displayed on the screen of the client terminal when a contact has been added to the temporary contact list, even when the user interface is not being displayed, and/or when the user interface displays a different contact list.

The temporary contact list may be generated, for example, at client terminal 204 by gathering module 212A and/or user interface 212B, and/or at server 202 by priority list module 214B or another suitable module. The temporary list is presented on the screen of the client terminal by user interface 212B.

Optionally, at 310, incoming transmissions of communication traffic based on different communication media are intercepted and sorted, for example, packets, notifications, emails, IM, and SMS. The interception and sorting may be performed, for example, by a sniffer module 212C installed on client terminal 204.

For each incoming communication, the sender is identified. For each sending contact, the incoming communication messages may be gathered. The gathered incoming messages may be presented based on the sending contact, instead of, for example, organizing the incoming messages by application. For example, all missed interactions from contact A, all missed interactions from contact B, and the like, instead of, for example, all unread emails, all missed calls, and the like. It is noted that for each contact, the incoming messages may be sub-organized based on application and/or media type.

The user interface may display, next to each contact icon of the priority list, notification icons representing the incoming communications sent by the contact icon. Each type of incoming message may be represented by the application icon related to the message. Activating the application icon triggers a larger display of the communication message (e.g., the email, or IM chat session). Once activated, the incoming messages may be removed from the user interface.

The user interface may display contact icons with the incoming communication on the screen even when the user interface is not fully activated, for example, a photo of the contact from which there was a missed call or unread email. Activating the contact icon opens up the communication in the relevant application. Dragging the contact icon to a predefined location on the screen hides the icon for future display when the full user interface is launched.

Icons representing the sending contact having one or more unread and/or missed notifications may be presented on the screen. The icons may be presented independently of the activation status of the user interface, for example, when the user interface is not being displayed on the screen. The icons may include a picture of the contact. Selecting the picture (e.g., pressing the icon with the finger, or by a cursor selection) may trigger a presentation of the missed notification. One or more icons representing the respective application used to transmit the communication notification may be displayed around the contact icon, representing the missed communication medium.

Optionally, at 312, the communication session is established with contacts during a lock screen mode, for example, based on user interface 212B. The interaction may proceed, for example, based on the description of block 113.

During the lock screen mode, the user interface may display the priority list (e.g., as in block 108), and/or the supported interactions list (e.g., as in block 110). Additional items may be displayed on the screen, such as one or more of: method to unlock the phone, time, date, and non-interaction applications such as a camera.

Optionally, when the user selects (e.g., drags) a certain contact icon, the user interface becomes active, allowing the interaction to continue. Alternatively, the user interface may become active upon dropping of the contact icon on a certain application icon to activate the interaction. The additional items may disappear from the screen. The client terminal may return to the lock screen mode upon completion of the interaction.

When the client terminal requires the user to enter a predefined pattern (e.g., code) to unlock the lock screen mode, the user may be prompted to enter the pattern before the interaction is activated, or at another point during the process.

Optionally, at 314, the content of an application executed in the background is shared with the contact selected as part of the gesture crossing over the actively running application. Alternatively or additionally, the content and/or context of one or more currently running applications in the background (installed on the client terminal or remotely accessed) are analyzed and/or considered during presentation of the user interface. When the user interface is activated during execution of a running application, the context and/or content of the running application is considered for compatibility with the features of the user interface, for example, by a context module 212D (installed on the client terminal and/or by a context module 214D installed on the server) configured to perform the functions described herein.

Optionally, the content displayed in the background (i.e., within the interactive region) is presented to the contact, or a link to the content is provided to the contact. The communication medium for sharing the content may be selected based on the gesture being continued to a certain application, and/or automatically defined by the script integrated within the running application displaying the content in the background.

The running application may be compatible with the user interface, for example, by implementing a script, such as an application programming interface (API), a software development kit (SDK) and/or by having an internal support for the user interface. Optionally, an interface module 214E containing an SDK, a script, an API, and/or other external interface program instructions is available for download, for example, from server 202. The Interface module may be implemented during development of a software application, to integrate the new software application with the user interface. The Interface module may provide instructions for the user interface to interact with a selected contact based on the content of the developed software application. The Interface module may analyze the type of content being displayed to the user by the new software application.

A contact icon may be selected for interaction using the single gesture with the currently running application, for example, by dropping the contact icon on the background showing the currently running application, and/or by dropping the contact icon on an application icon representing the currently running application. The interaction of the selected contact with the currently running application is based on the currently running application. The currently running application may be, for example, shared with the contact, forwarded to the contact, and/or incorporated with the application depicted by the application icons for interaction with the contact.

Exemplary interactions include:
When the running application is a browser, the interaction includes sharing the current URL with the selected contact, for example, by email.
When the running application is an image gallery, the interaction includes sharing the current image and/or album with the selected contact, for example, by an IM.
When the running application is a mCommerce application, the interaction may include a request to the contact for advice on whether to buy the product.
When the running application is a mobile game, the interaction may include generating an invitation to the contact to join the game.

Alternatively or additionally, dropping the contact icon on the application icons (other than the currently running application) performs the interaction based on the context of the running application. For example, dropping a contact icon on an email icon when a browser is running may automatically send an email of the URL being browsed to the contact.

Optionally, upon selection of the contact as part of the gesture, the displayed application icons represent functions available for interaction with the contact based on the actively running application. The script integrated within the actively running application may define the available functions. For example, when the actively running application is a game, exemplary available functions include: send a screen shot, send an amount of game currency, and add the contact to the same team as the user within the game.

When the user activates an application that may be integrated with the user interface (i.e., the application having the Interface module integrated therein), a notification may be displayed indicating that activation of the user interface within the running application integrates the running application within the user interface as described herein. For example, an icon (optionally blinking) representing the user interface is displayed on the screen during execution of the application.

Optionally, the order of the priority list is dynamically changed based on the running application. Alternatively or additionally, a new priority list is generated based on the running application. For example, based on the online/offline presence of the contact within the running application, whether or not the contact has subscribed to the running application, based on contacts that have the running application installed on their respective client terminals, based on the ability of the contacts to receive and process file formats of the running application, based on contact defined topics of interest, and history of interaction with the contact using the running application.

Icons of certain contacts may be displayed within the running application integrated within the user interface, without displaying the full user interface on the screen. The icons of certain contacts may be displayed based on an analysis of the association of the running application with the contacts. For example, when the running application displays content that is usually shared with a certain contact, the icon of the certain contact may appear as a suggestion to share the content with the contact. In another example, when the running application is a game, icons of contacts currently playing the game on-line and/or having the game installed may be displayed for an invitation to join the game.

Optionally, at 316, a drive mode is activated, for example, based on user interface 212B. The drive mode is designed for establishing the communication session when the user is driving.

The number of contact icons and/or application icons displayed by the user interface is reduced during the driving mode. The reduced number of icons may make it easier to perform the selection and activation during driving. The reduced number of client icons may be based on user behavior during driving, optionally including the most likely clients to be contacted during driving. The reduced application icons may include the most likely applications for establishing the communication session during driving, for example, call and navigate.

The accuracy in performing the single gesture (e.g., dragging and/or dropping) is reduced based on the reduced number of icons. The dragging and/or dropping may be performed when the user does not directly touch the icons, such as the finger of the user being closer to one icon than to another icon, and/or at a different part of the screen. For example, dropping the contact icon at the top half of the screen generates a call to the contact, and dropping the contact icon at the bottom half of the screen generates directions to the contact.

Drive mode may be manually activated by the user, or automatically activated by software automatically detecting that the user is driving.

Optionally, at 318, the user interface is synchronized with a contact application and/or directory (e.g., phone and/or address book) installed on the client terminal.

The synchronization may include an icon representing the user interface being displayed in the contact application. The user interface icon may allow activation of the user interface including the selected contact of the phone book.

Contacts appearing within the phone book may be marked when presented in a group contact icon, for example, with a different color.

The group automatically generated as part of the group icon may be automatically entered into the phone application, using a general phone number (when groups are supported by the phone application).

The favorite applications of the contacts in the phone book may be identified. When the user interface is activated while one of the favorite applications is running, those contacts that indicate that the running application is one of their favorites may be considered for selection in the priority list.

Optionally, at 320, the presence representation (also referred to herein as presence state) is generated for each contact of the user, such as the contacts appearing within the priority list, and/or other contacts not currently appearing within the list but being candidates for appearance within the list. Alternatively or additionally, a presence representation of the user is generated for transmission to the central server or to the contacts.

Optionally, a presence state is generated for the contacts of the user based on multiple parameters obtained from multiple different applications (which may be installed on the client terminal of the user and/or the contact) which are indicative of the ability to communicate with the contact. The presence state represents the ability to interact with the respective contact. For example, the ability to interact at all with the respective contact (e.g., contact is unavailable), the ability to interact in real-time (e.g., the contact is online or otherwise reachable), the ability to interact quickly (e.g., the contact is offline but checks messages regularly). The presence state may represent how to interact with the respective contact, for example, the media type, the application type, and/or the time of day. The presence state may be absolute (e.g., contact or do not contact, contact using email only), or based on a scale (e.g., denoting preferred applications for interaction, better times of the day for interaction).

The presence state may serve as a basis for other functions described herein. Optionally, contacts are selected for the priority list based on the presence state. Contacts having higher presence state values or certain presence states, denoting a better chance of the user being able to interact with the respective contact, are selected over contacts with lower presence state values or different presence states. The contacts may be selected based on the presence state when the user interface is activated, to provide the list of contacts available for establishing the communication session. The contacts selected based on the presence state are more likely to result in a successful establishment of the communication session, for example, more likely to respond to a chat session, more likely to respond to an invitation to play a game, and more likely to pick up a phone call. Alternatively or additionally, contacts on the priority list are re-ordered based on changes to the presence state of each contact. Alternatively or additionally, the applications displayed as available for interaction with the contact are selected and/or changed based on the presence state of the selected contact. For example, when the selected contact disconnects (i.e., now offline), real-time interaction applications are removed from the user interface.

The presence representation is generated based on multiple factors retrieved from multiple different applications installed on the client terminal. The presence state is effectively a cross-application representation of the user and/or the contacts. Exemplary factors include one or more of: time of day, day of the week, hour of the day, geographical location, calendar events, current call status (in a call or not), when the client terminal was last touched, driving state (currently driving or not), the applications installed on the client terminal, application(s) currently being executed on the client terminal, network connectivity state, wireless connectivity state, battery state, relative frequency of application used by the certain contact (e.g., uses a first IM application more frequency than a second IM application), and manual configuration settings (e.g., silent mode or do not disturb mode).

The presence state may be represented as, for example, a probability value that the user is able to interact with the respective contact, a multi-dimensional vector representing possible ways of interacting and/or not interacting with the contact, a normalized value of the user interacting with the contact relative to other contacts, and/or other suitable data structures.

Each user may generate his/her own presence state and transmit the presence state to respective client terminals of respective contacts. Alternatively or additionally, the client terminal of the user may locally generate presence states for contacts of the user based on information obtained from the client terminal of the user and/or based on information received from respective client terminals of respective contacts.

The presence state may be calculated at central sever 202 based on a presence state module 214C, and/or at client terminal 204 based on a presence module 212E, and/or at another external server. The presence module is configured to generate the presence representation as described herein.

Optionally, contacts are selected for the priority list based on the presence representation of each respective contact. For example, the contacts having the highest ratings on a presence representation scale are selected. Alternatively or additionally, contacts within the priority list are sorted based on the presence representation of each contact. For example, contacts are sorted in decreasing order based on the presence representation.

Alternatively or additionally, the available interactions (i.e., the application icons) are selected and/or changed based on the presence representation of the contacts. When a certain contact is selected (e.g., being dragged), the available applications for interaction may be changed, for example, disabled, removed, and/or replaced. For example, when the presence representation of the selected contact indicates a status of sleep, abroad, or driving, certain applications may be disabled, such as application requiring real time interactions, for example, phone calls and chat.

Alternatively or additionally, the application icons available for interaction with the selected contact are marked or tagged with a notification based on the presence representation of the selected contact. For example, when the presence representation indicates the selected contact is on another call, the phone application and/or other applications based on real time interaction may be marked accordingly. For example, a small icon may be present indicating the contact is unavailable, the application may be blacked out, or tagged.

Alternatively or additionally, new actions are generated based on the presence state. The new actions may be directly dependent on the presence state. For example, when a user performs the gesture to initiate a call with a certain contact having a presence state stating that the contact is already on a call, a new action is presented to the user. The new action includes a reminder to call the contact when the presence state of the contact has changed indicating that the contact has ended the call and available. Optionally, the user is presented with the option to be notified when the presence state has changed to allow a new type of communication session that was not available with the previous presence state. For example, the user may select to be contacted when the presence state of the contact has changed from the contact not having sufficient battery and/or wireless link and/or cellular access for a phone call, to the user having sufficient battery and/or wireless link and/or cellular access for the phone call.

Optionally, one or more parameters of the presence representation of the selected contact are integrated with the information of the selected contact to provide a basis for interaction using one of the application icons. For example, the current location of the selected contact may be used by a navigation application to generate directions to the current location of the user, instead of, for example, using the home address of the selected contact.

Figure 4:
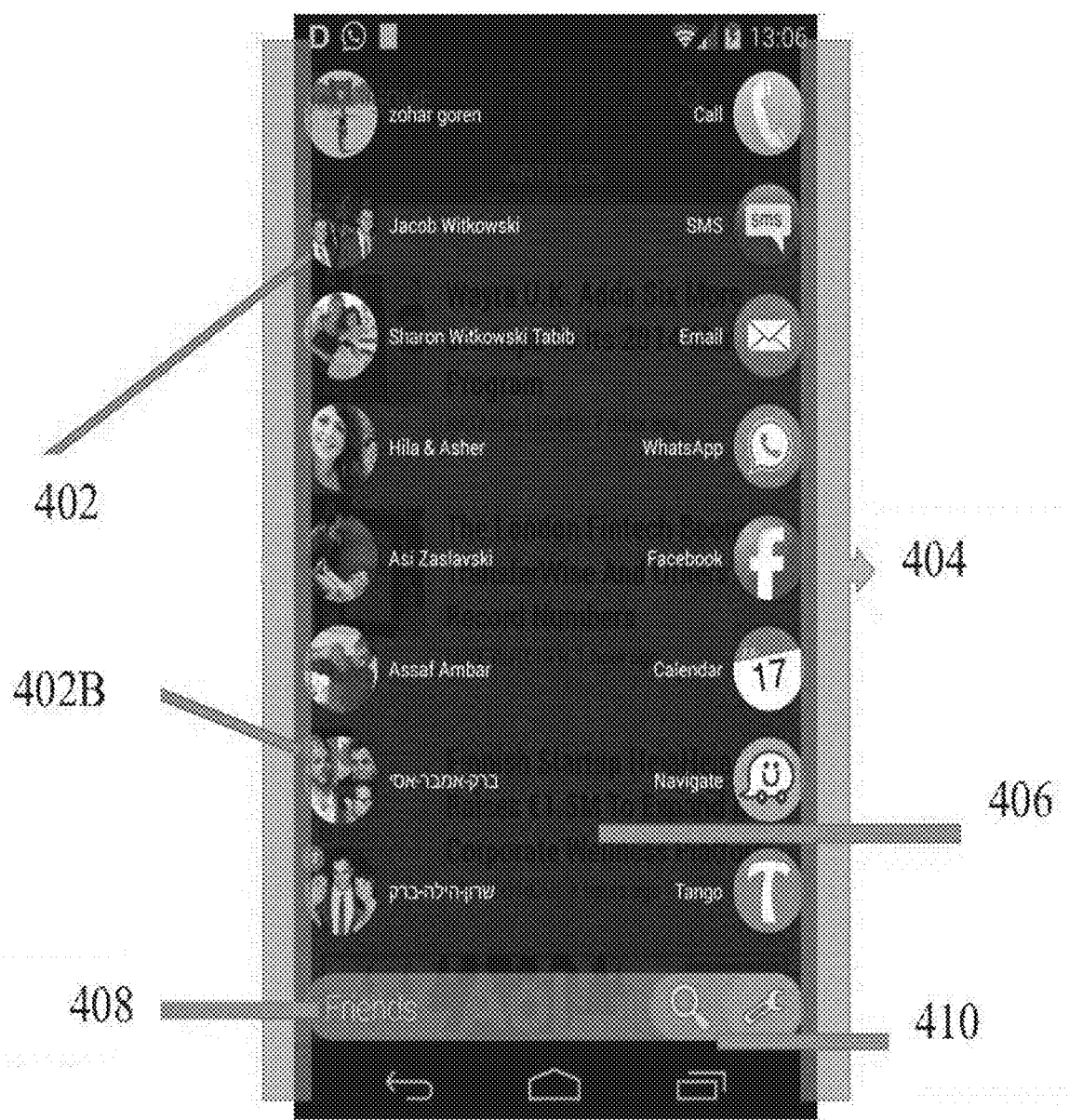
FIG. 4 is a screen capture of an exemplary implementation of a user interface, in accordance with some embodiments of the present invention.

Reference is now made to FIG. 4, which is a screen capture of an exemplary implementation of the user interface, in accordance with some embodiments of the present invention. The user interface may be displayed on a screen of the client terminal, for example, a Smartphone.

Contact icons 402 are displayed along the left border of the screen. Each contact icon 402 includes a thumbnail image and a name. Contact icons 402 may represent a single contact, or multiple contacts (shown as contact icon 402B). Multiple contact icon 402B includes a thumbnail integrating pictures from the contact members, and a name comprised from names of the members.

Application icons 404 are displayed along the right border. Icons 404 include a textual description or name of the application and a thumbnail image.

Icons 402 and 404 are selected to fit within the available screen space so that the user does not have to scroll to see additional contacts or applications.

The currently running application running in background 406 is dimmed but still visible.

Label 408 (shown as friends) indicates the type of priority list. Multiple labels may be available.

Search icon 410 provides a function to search for contacts that are not displayed.

Figure 5:
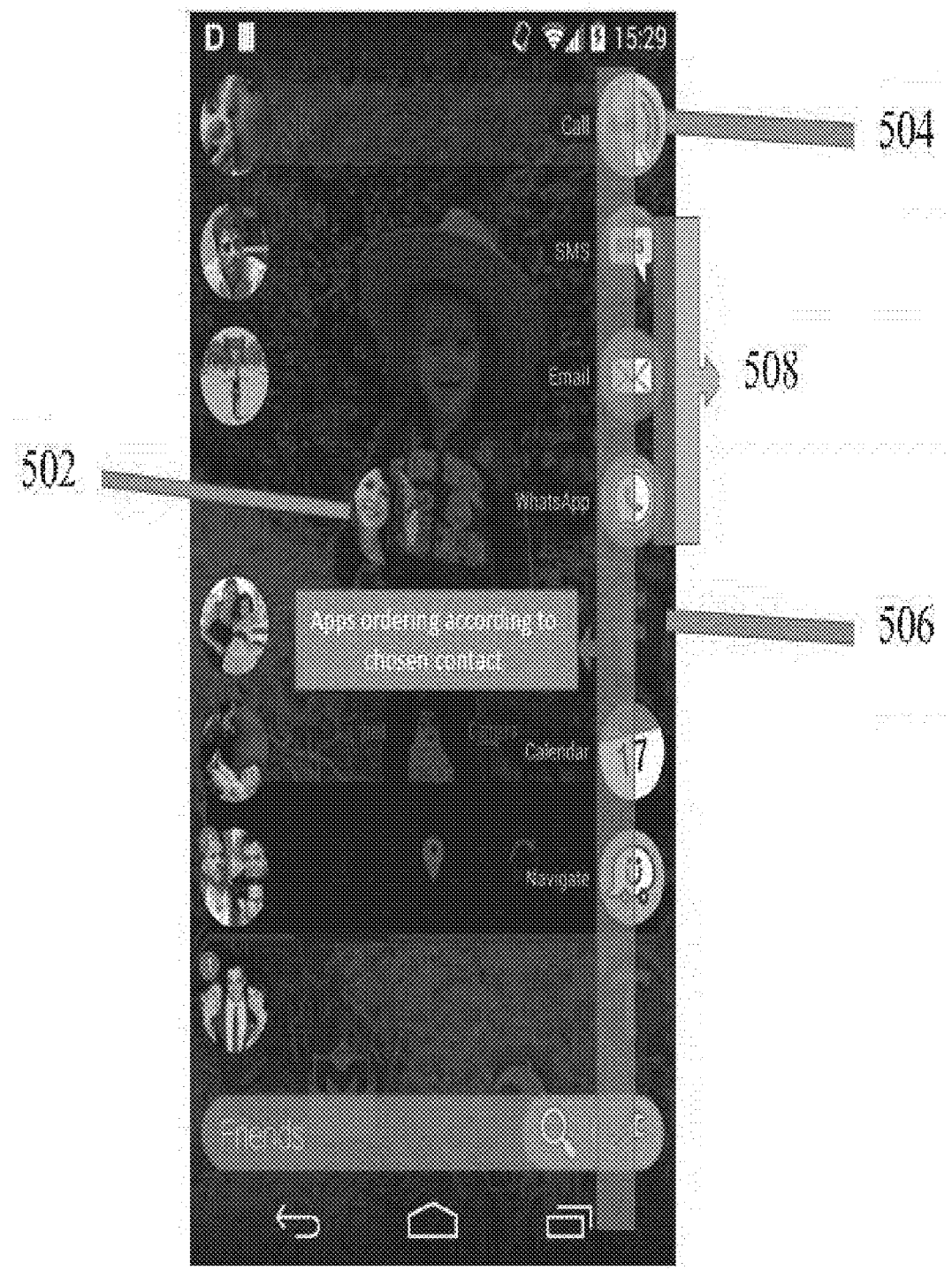
FIG. 5 is another screen capture of an exemplary implementation of the user interface, in accordance with some embodiments of the present invention.

Reference is now made to FIG. 5 which is another screen capture of an exemplary implementation of the user interface, in accordance with some embodiments of the present invention. The screen capture of FIG. 5 may occur after the screen capture of FIG. 4.

Contact icon 502 has been selected and dragged towards the application icons across the interactive region (located between the contact icons and the application icons), using the gesture performed by the user as described herein. The application icons are dynamically changed based on selected contact icon 502, as described herein, for example, based on the presence representation of contact icon 502. Call icon 504 is changed to indicate that contact represented by contact icon 502 is currently on another call. Social network application icon 506 is dimmed to indicate that the social network application represented by icon 506 cannot be used to establish the communication session with contact 502. Icons 508 represent possible applications for establishing the communication session with contact 502.

Figure 6:
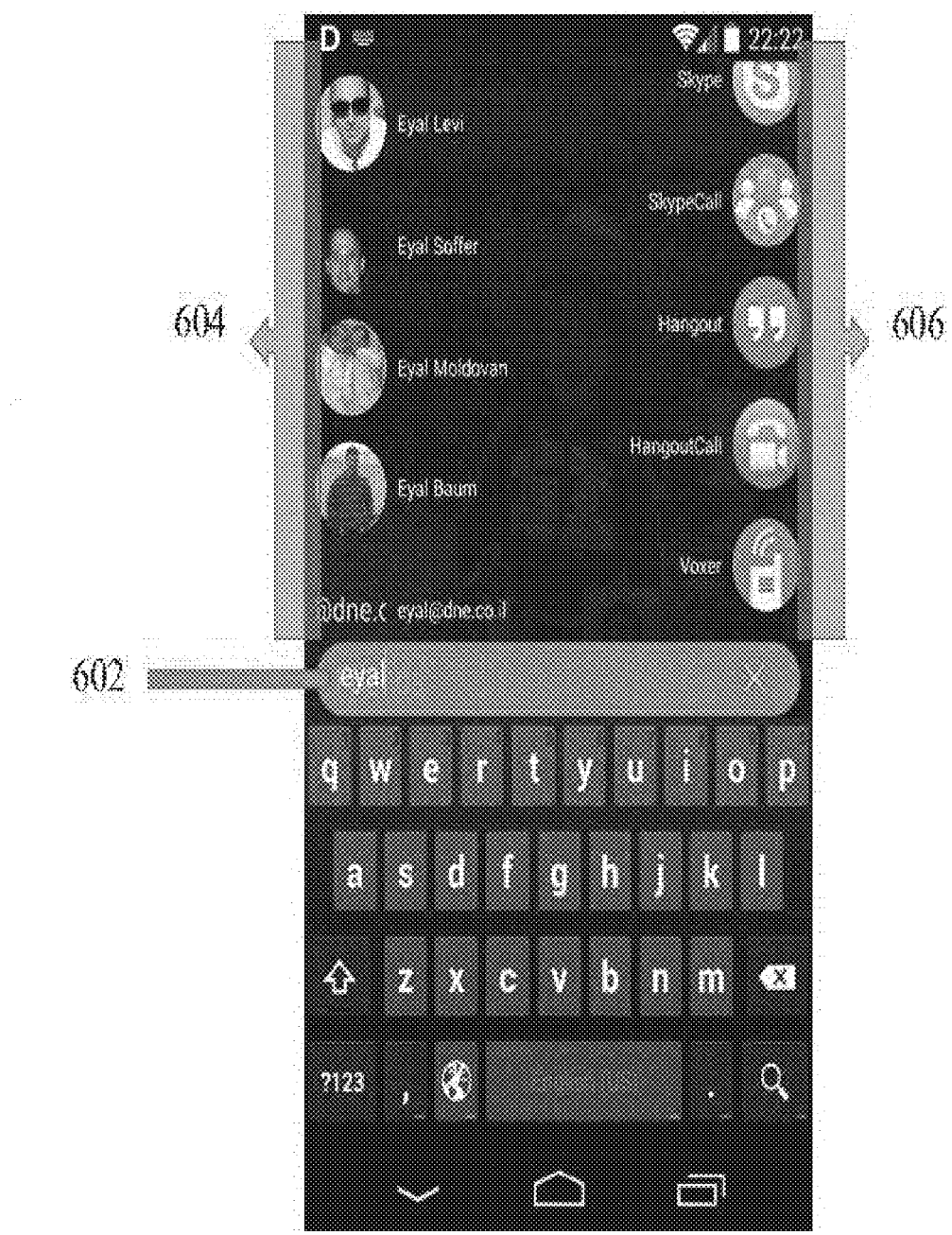
FIG. 6 is yet another screen capture of an exemplary implementation of the user interface, in accordance with some embodiments of the present invention.

Reference is now made to FIG. 6 which is another screen capture of an exemplary implementation of the user interface, in accordance with some embodiments of the present invention. The screen is captured during a search for a contact, for example, as described herein.

A search string 602 is entered in the user interface (shown as eyal). A cross-application search is performed to match the search string with possible contacts obtained from the different applications. Search results 604 represent all the eyal contacts found in the different applications. Thumbnails and names are show as icons when available. When not available, the matched contact information is displayed, for example, an email address containing the search string.

Application icons 606 are displayed during the search. Any of the search results may be dragged and dropped onto any of the displayed application icons to establish the communication session, as described herein.

Figure 7:
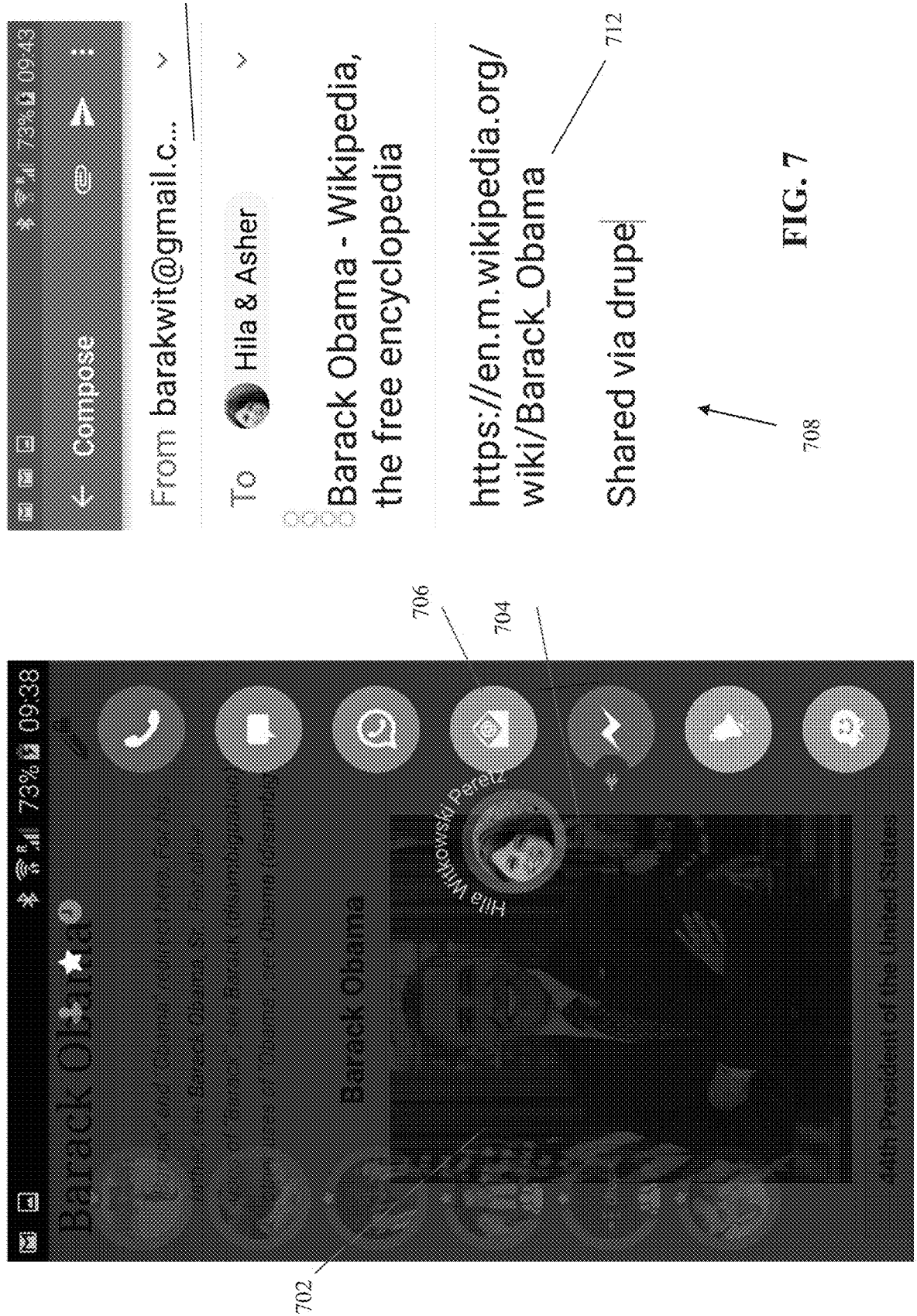
FIG. 7 is yet another screen capture of an exemplary implementation of the user interface, in accordance with some embodiments of the present invention.

Reference is now made to FIG. 7 which is another screen capture of an exemplary implementation of the user interface, in accordance with some embodiments of the present invention. The screen capture represents sharing the content of the application running in the background (displayed within the interactive region) with the contact of the cross display gesture.

The user interface has been activated while the user has been using a certain running application 702, for example, using a web browser to browse a web document, shown dimmed in the background of the user interface.

Contact icon 704 has been selected for interaction based on running application 702 based on the cross display gesture, as described herein, for example, dragging and dropping icon 704 on the interactive region background displaying running application 702. Icon 704 may be further dropped on an interaction icon 706 triggering the establishment of the communication session with contact 704 based on running application 702. For example, sending the URL of the website in the background (i.e., based on application 702) using email (i.e., based on icon 706) to contact information of icon 704.

The screen may change to an email client interface 708, which is automatically populated with an email 710 of contact 704 and a URL 712 of the website. Application 702 may have the Interface module integrated therein, as described herein, for example, the interface script has been incorporated into the web browser and/or into the website being browsed. Performing the cross display gesture using the contact icon crossing over a portion of the interactive region triggers the Interface module within application 702 to issue a command to activate email client interface 708 and to include the URL and email of the contact.

Figure 8:
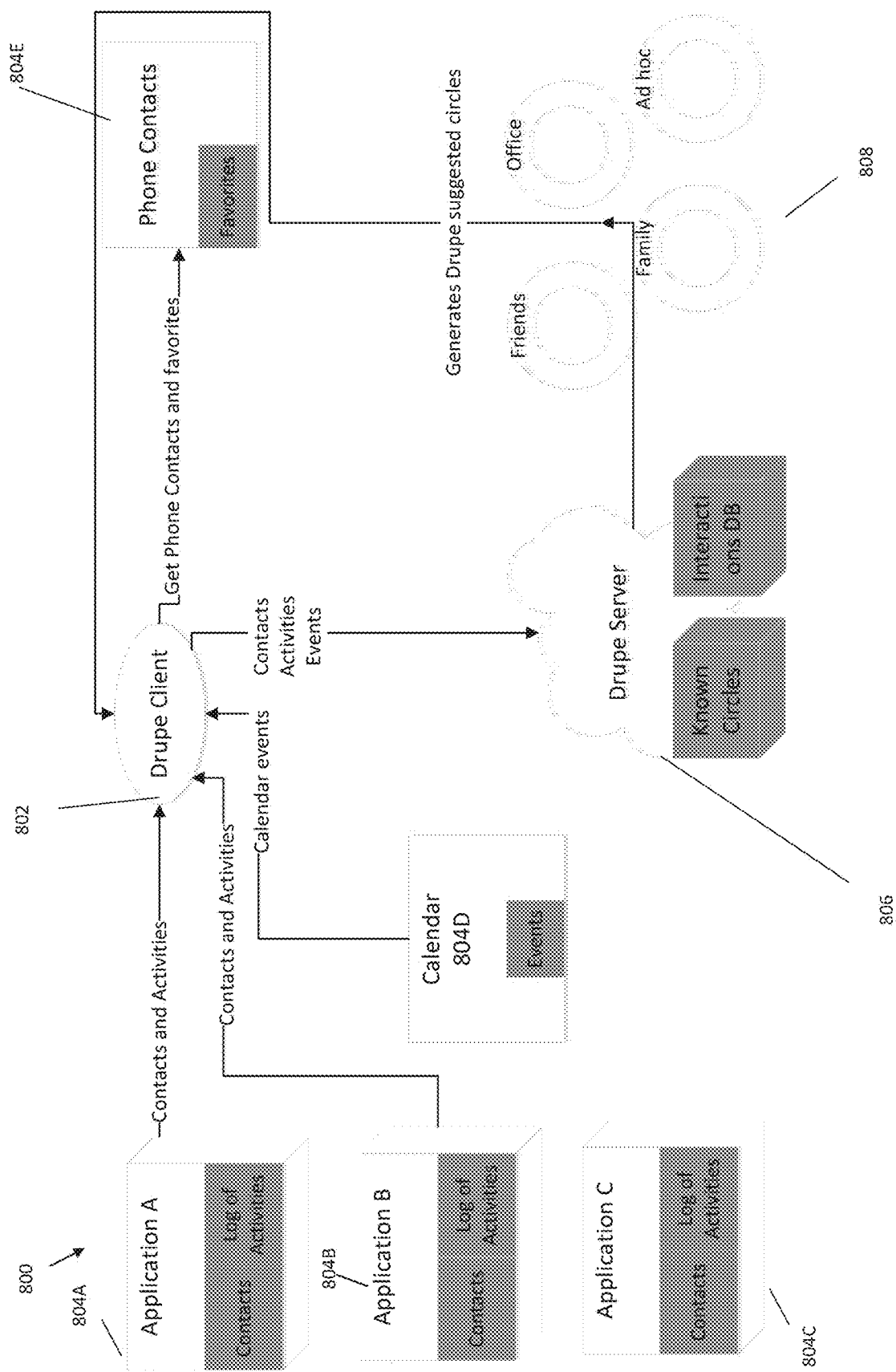
FIG. 8 is a block diagram of an exemplary implementation of the system FIG. 2, in accordance with some embodiments of the present invention.

Reference is now made to FIG. 8, which is a block diagram of an exemplary implementation of system 200 of FIG. 2, in accordance with some embodiments of the present invention. System 800 is designed to generate the priority list, as described herein. System 800 of FIG. 8 may execute blocks 102-106 of FIG. 1, as described herein.

System 800 includes a client module 802 installed on a client terminal, such as a smartphone. Module 802 is configured to query relevant applications 804A-C (installed on the smartphone) to retrieve and/or extract contact details and/or activity logs. Module 802 is configured to query relevant applications 804D to retrieve events associated with the contacts, for example, from a calendar application. Module 802 is configured to query known contacts, including contacts from a contact directory 804E.

Client module 802 transmits the collected data to a central server 806 for analysis. The analysis may be performed based on data stored in databases stored on server 806, for example, a geographical database storing location of cities, and an interaction database storing previously defined associations between contacts.

Server 806 generates one or more priority lists based on the analysis, represented as circles 808. Each circle includes the favorite user contacts (which the user is estimated to most likely to contact) based on a category, for example, friends, office, family, and ad hoc (i.e., temporary as described herein). Server transmits the generated circles 808 to the respective client module 802.

Figure 9:
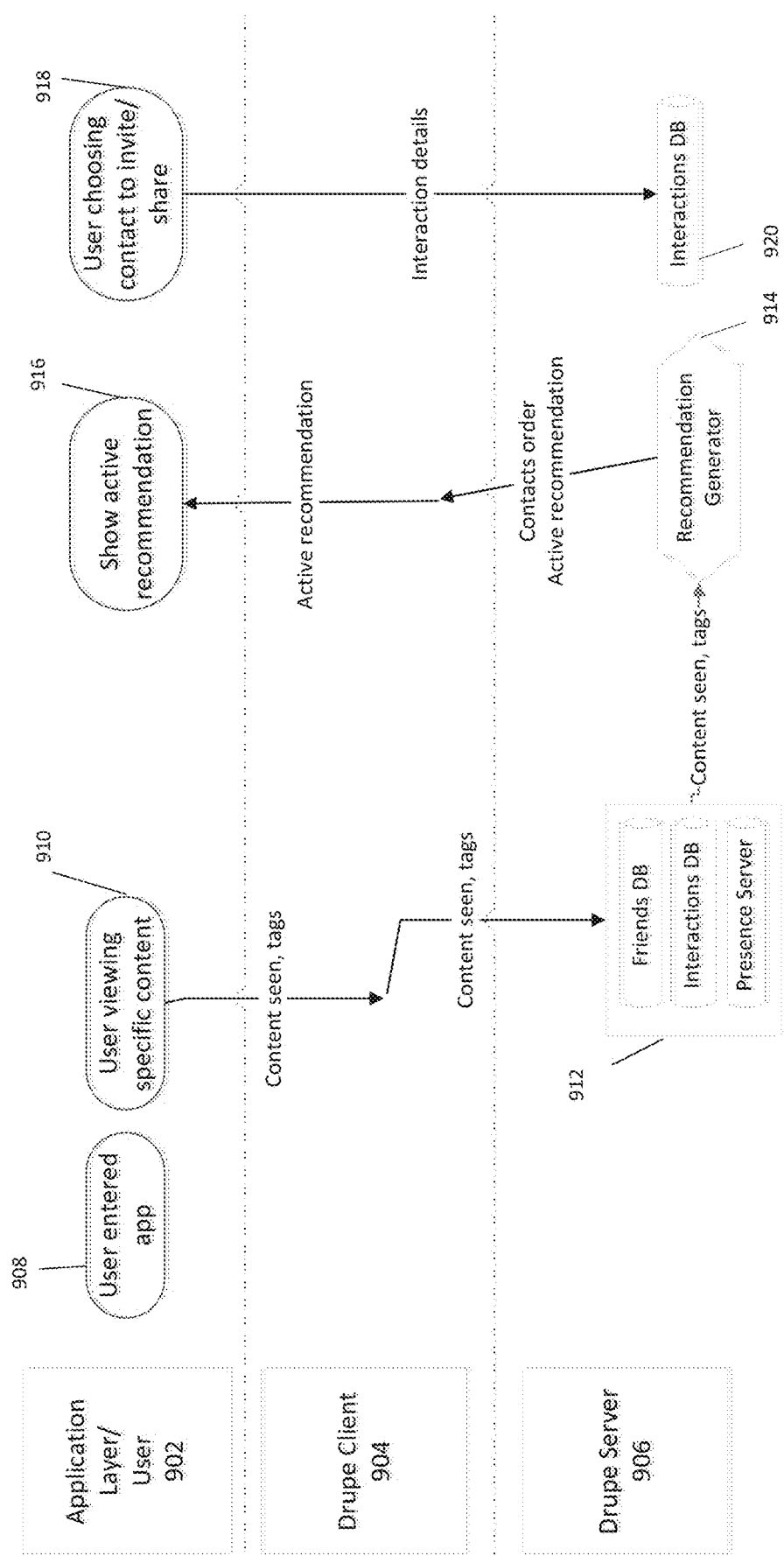
FIG. 9 is a dataflow diagram of an exemplary implementation of the system of FIG. 2, for changing the order of the generated priority list, in accordance with some embodiments of the present invention.

Reference is now made to FIG. 9, which is a dataflow diagram of an exemplary implementation of system 200 of FIG. 2, for dynamically changing the order of the generated priority list, in accordance with some embodiments of the present invention. The order may be changed based on the context of the content displayed on the screen of the client terminal. Recommendations for interactions may be automatically generated and presented on the screen.

A client module 904 runs over an application layer 902 of a client terminal, as described herein. Server 906 communicates with client module 904, as described herein.

At 908, the user activates a certain application on the client terminal.

At 910, the user views certain content displayed on the screen by the certain application, for example, an article on a website of a browser. The certain application notifies client 904 of the type of content being displayed, for example, an article about football. The data of the context of the content is transmitted to server 906.

At 912, server 906 analyzes the received context of the content. The context and/or content data may be analyzed by accessing databases, for example, a friends database storing known favorite contact of the user, an interaction database storing known interactions of the user with other contacts, and a presence server for determining the presence state (as described herein). The analysis may provide a set of friends of the user which are interested in the content the user is viewing (i.e., football). The analysis may further provide a sub-set of the identified set of friends that the user usually shares such articles with. The analysis may be based on the current presence of the friends determined by the presence server, for example, to share the article with friends that are currently online.

At 914, a recommendation generator module generates a new priority list, or re-orders the existing priority list, based on the analysis. The list is transmitted to client 904.

At 916, the list of recommended contacts for sharing the content being viewed by the user is displayed to the user. The list may be displayed when the user interface (as described herein) is activated by the user, or the list (or a sub-set thereof) may appear on the screen without the user having activated the full user interface. For example, when the user usually shares football articles with a certain friend, client 904 displays an active suggestion to share the article being viewed with the friend.

At 918, the user selects to interact with a contact (the recommended contact or another contact) based on the content displayed on the screen by the running application, as described herein. The details of the interactions are transmitted to server 906, optionally stored in interaction database 920 as an update, to generate future recommendations and/or priority lists, as described herein.

Figure 10:
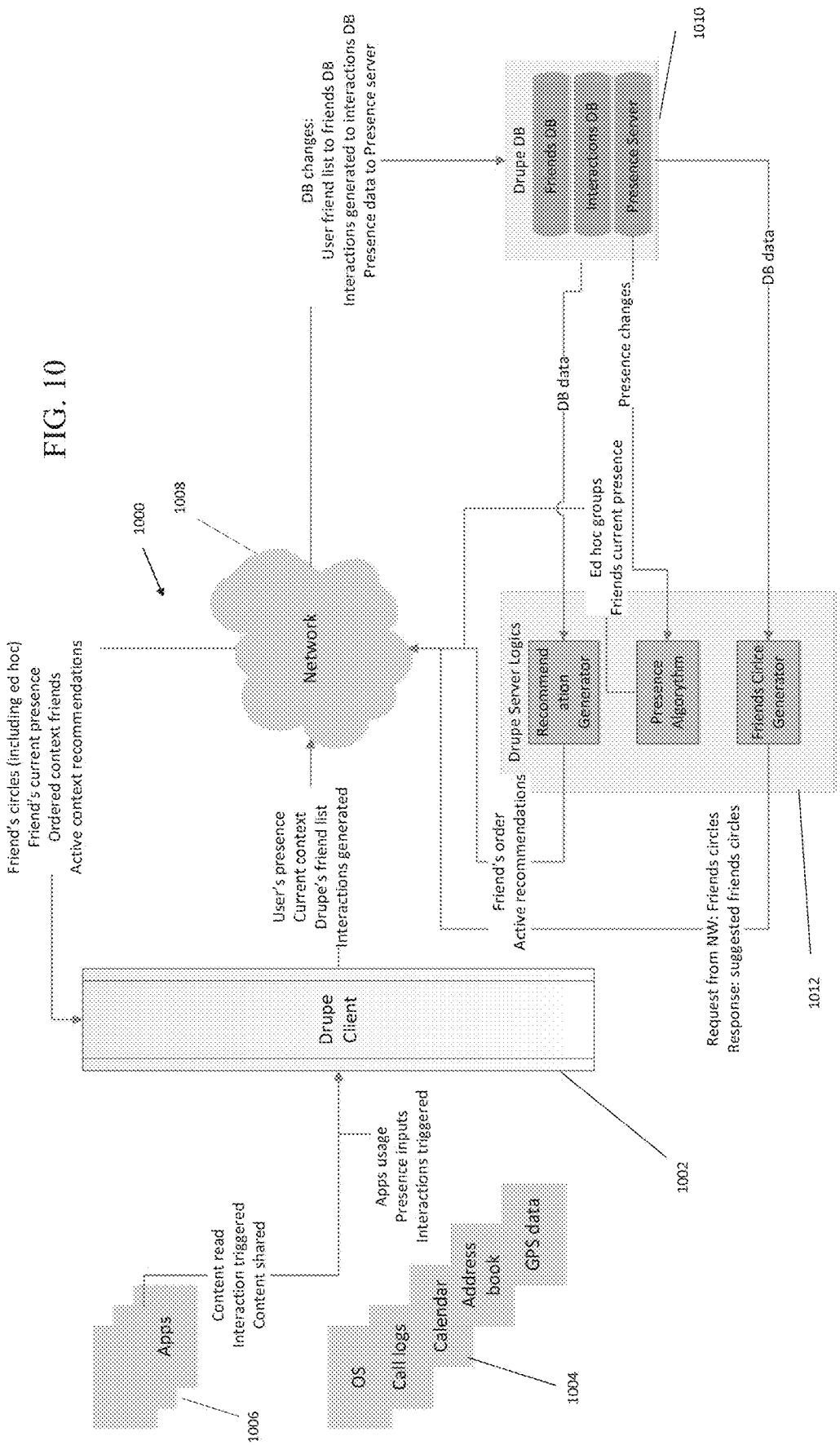
FIG. 10 is a block diagram of another exemplary implementation of the system of FIG. 2, in accordance with some embodiments of the present invention.

Reference is now made to FIG. 10, which is a block diagram of an exemplary implementation of system 200 of FIG. 2, in accordance with some embodiments of the present invention. System 1000 of FIG. 10 may execute the method of FIG. 1, as described herein.

A client module 1002 installed on a client terminal (e.g., smartphone) receives data from multiple applications installed on the client terminal. Data may be received from multiple different applications 1004 (e.g., operating system, call logs, calendar, address book, geographical position), representing user usage of each application, parameters used to calculate the user presence representation (as described herein), and/or interactions with contacts based on the respective application. Data may be received from one or more applications 1006 currently running in the background including data representing content viewed and/or shared by the user, and/or applications 1006 selected for interaction with contacts (as described herein) including data representing the triggered interaction.

Client module 1002 transmits the gathered data over a network 1008 (e.g., wireless network, cellular network, the internet) to a central server. The data may be initially organized and/or analyzed by client module 1002, for example, to generate a list of friends. The server may organize the received and/or analyzed data into one or more databases 1010, as described herein. Exemplary databases include: a friends database for storing gathered friend contacts; an interaction database for storing gathered interactions with contacts and/or shared content and/or triggered interactions; and a presence database (or server) for storing and/or gathering presence parameters.

One or more server modules 1012 analyze the received data, directly and/or by accessing databases 1010, as described herein. Exemplary modules 1012 include: a recommendation generator for re-ordering the priority list, and/or generating recommendations for interactions based on content context, for example, based on the data in the friends database and/or the interaction database; a presence module for calculating the presence state; and a friends circle generating for generating one or more priority lists, for example, based on the data in the interaction database.

The server transmits the results of modules 1012 to client module 1002 through network 1008. Exemplary transmitted data includes: one or more priority lists of contacts, the presence representation state of one or more contacts, re-ordered priority lists, and recommendations for sharing of context.

Figure 11:
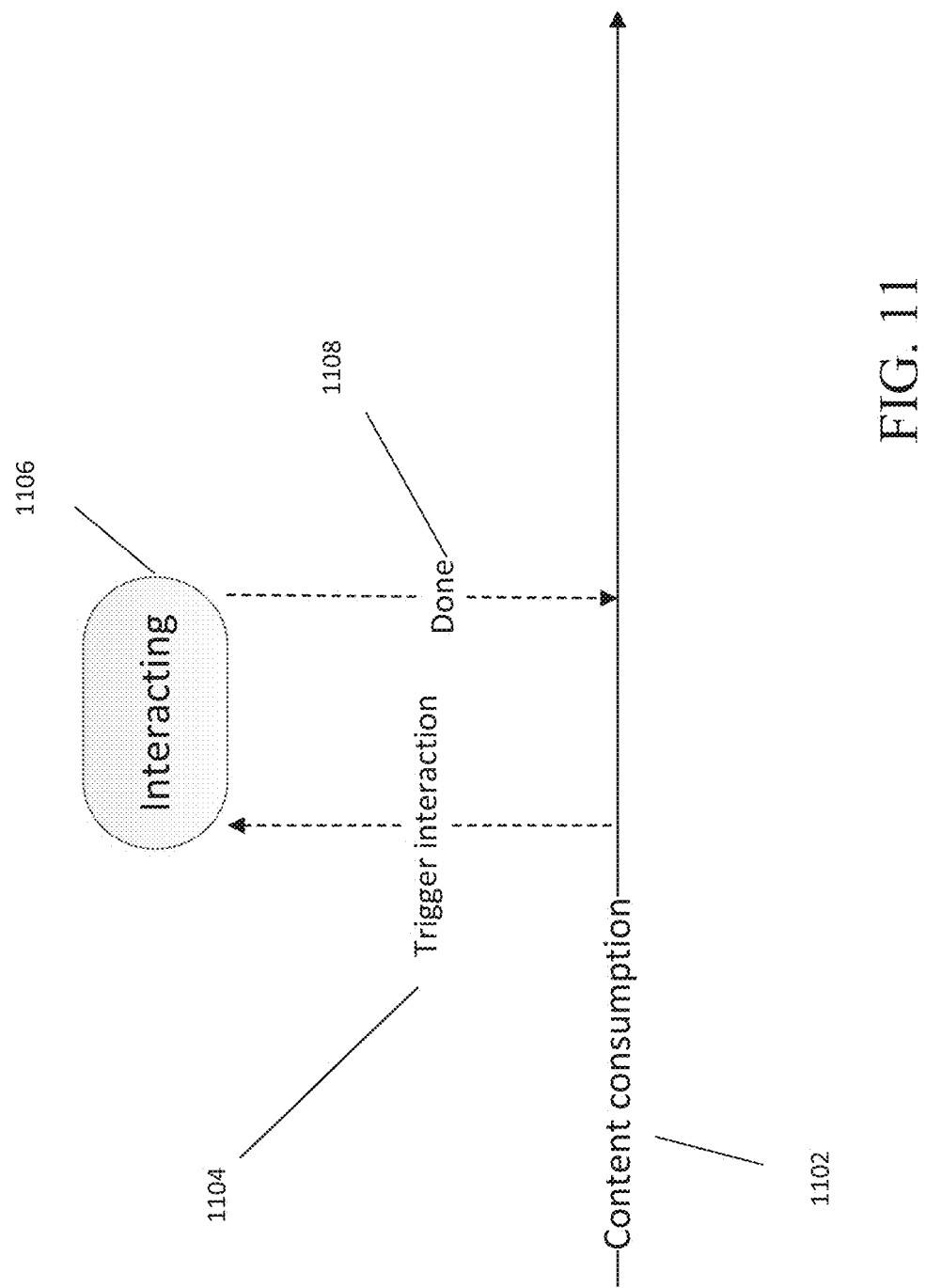
FIG. 11 is a dataflow diagram graphically depicting establishing a communication session with a certain contact based on content being displayed on the screen of the client terminal by a running application, in accordance with some embodiments of the invention.

Reference is now made to FIG. 11, which is a dataflow diagram graphically depicting triggering an interaction with a certain contact while content is being displayed on the screen of the client terminal by a running application, in accordance with some embodiments of the invention.

At 1102, the user is viewing content on the screen of the client terminal, based on an activated running application, as described herein.

At 1104, the user triggers an interaction while the application is running and content is being displayed on the screen. The user does not need to close the running application, and/or exit to the home screen. The trigged interaction allows the user to select the contact for the interaction. The interaction may be trigged by methods described herein based on the single gesture, for example, by activating the user interface directly, or by clicking on a presented icon (without activating the full user interface).

At 1106, the interaction is performed with the selected contact based on the context of the content, as described herein. For example, an email is sent to the selected contact with the URL of the web page the user is browsing.

At 1108, the interaction has been completed. The user is automatically returned to the actively running application. The user interface is removed.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant applications will be developed and the scope of the term applications is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method for establishing a communication session with at least one contact based on a cross display gesture, comprising:
displaying an array of contact icons along a first border of a display of an interactive user interface on a screen of a client terminal;
displaying an array of application icons along a second border of the display of the interactive user interface, the first and second borders being located on opposite sides of the screen separated by an interactive region of the interactive user interface which is located between the array of contact icons and array of application icons;
identifying a cross display gesture manually performed by the user, wherein the cross display gesture comprises dragging a certain contact icon of the array of contact icons and crossing the certain contact icon within the interactive region;
during the dragged certain contact icon is still crossing the interactive region before dropping the certain contact icon on a certain application icon of the array of application icons:
dynamically changing an order of the array of application icons displayed along the second border of the display of the interactive user interface based on a certain contact associated with the dragged certain contact icon to indicate applications the user is likely to use for establishing the communication session with the the dragged contact icon and an outcome of an analysis of historical communication sessions held by the user;
wherein the analysis is of at least one member selected from the group consisting of:
history of applications associated with the application icons and used by the user to communicate with the certain contact associated with the certain contact icon,
history of applications associated with the application icons and used by the certain contact associated with the certain contact icon to communicate with the user and/or other contacts associated with the contact icons, and
history of applications associated with the application icons and used by the user to communicate with contacts which are associated with contact icons other than the certain contact icons;
automatically selecting a certain application icon of the array of application icons based on the analysis of historical communication sessions; and
establishing a communication session between the user and the certain contact activated by the certain application icon.

2. The method of claim 1, wherein the cross display gesture is a substantially linear line with slight deviations based on user hand tremor or applied in a single uninterrupted continuous manner between the certain contact icon and the certain application icon.

3. The method of claim 1, wherein the first border is in proximity to an edge of the screen, and the second border is in proximity to an opposite edge of the screen.

4. The method of claim 1, wherein establishing the communication session comprises transmission of content currently displayed in the interactive region.

5. The method of claim 4, wherein the user interface is launched while an application using a content represented by the content icon currently displayed is running.

6. The method of claim 1, wherein before the array of contact icons is provided by being displayed on the screen of the client terminal, an order of contact icons in the array of contact icons is dynamically adapted according to a member of a group consisting of:
behavioral patterns of the user of the client terminal,
likelihood of the user contacting the contacts from at least one of: a certain location and at a certain time of the day, and
contacts using a certain application hosted on the respective client terminal of the contact; and
an analysis indicative of certain applications the user is likely to use for establishing the communication session.

7. The method of claim 1, further comprising receiving from the certain contact a manual configuration defining how the certain contact prefers to receive interactions from the user; wherein the order is set based on the manual configuration.

8. The method of claim 1, further comprising displaying at least one corporate contact within the array of contacts;
wherein the order is dynamically changed based on definitions obtained from the corporate contact for establishing communication sessions with the corporate contact.

9. The method of claim 1, further comprising:
gathering contact details and contact activity information of a plurality of contacts from a plurality of communication applications installed on the client terminal;
analyzing the contact details and contact activity information for each contact of the plurality of contacts of the plurality of communication applications, to prioritize the contacts based on likelihood of a user of the client terminal contacting each respective contact; and
generating a prioritized contact list based on the prioritized contacts, the prioritized contact list being a selected sub-set of the gathered contacts based on the highest likelihood of being contacted by the user;
wherein the array of contacts is obtained from the prioritized contact list.

10. The method of claim 1, further comprising generating a presence state for the contacts of the user based on multiple parameters obtained from multiple different applications, the presence state representing the ability to interact with the respective contact, and performing at least one of the following based on the presence state for each respective contact: generating the array of contacts, reordering the array of contacts, and selecting the array of application icons.

11. The method of claim 10, wherein the presence state is calculated based on one or more parameters selected from the group consisting of: time of day, day of the week, hour of the day, geographical location, calendar events, current call status, when the client terminal was last touched, driving state, the applications installed on the client terminal, applications currently being executed on the client terminal, network connectivity state, wireless connectivity state, battery state, relative frequency of application used by the certain contact, and manual configuration settings.

12. The method of claim 1, wherein each displayed application icon represents a type of communication session, each respective type of communication session associated with a plurality of other applications for establishing the communication session with the contact, and further comprising automatically selecting one of the plurality of other applications when the user selects a certain type of communication session.

13. The method of claim 12, wherein the automatically selecting one of the plurality of other applications is based on at least one of: application usage by the selected contact, history of previous communication sessions with the selected contact, presence state of the selected contact, and preferences of the selected contact.

* * * * *